US011653398B2

(12) United States Patent
Chen et al.

(10) Patent No.: US 11,653,398 B2
(45) Date of Patent: May 16, 2023

(54) BLUETOOTH CONNECTION METHOD AND DEVICE

(71) Applicant: Huawei Technologies Co., Ltd., Shenzhen (CN)

(72) Inventors: Zhichao Chen, Xi'an (CN); Liang Wang, Shanghai (CN); Yuhong Zhu, Shanghai (CN); Yong Zheng, Shanghai (CN); Jingyun Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/298,289

(22) PCT Filed: Nov. 30, 2018

(86) PCT No.: PCT/CN2018/118783
§ 371 (c)(1),
(2) Date: May 28, 2021

(87) PCT Pub. No.: WO2020/107485
PCT Pub. Date: Jun. 4, 2020

(65) Prior Publication Data
US 2022/0039179 A1    Feb. 3, 2022

(51) Int. Cl.
*H04W 76/14* (2018.01)
*H04W 76/15* (2018.01)
*H04W 4/80* (2018.01)
*H04R 1/10* (2006.01)

(52) U.S. Cl.
CPC .......... *H04W 76/14* (2018.02); *H04R 1/1041* (2013.01); *H04W 4/80* (2018.02); *H04W 76/15* (2018.02); *H04R 2420/07* (2013.01)

(58) Field of Classification Search
CPC ....... H04W 76/14; H04W 4/80; H04W 76/15; H04W 12/50; H04W 12/55; H04R 1/1041; H04R 2420/07; H04R 1/1025; H04R 1/1016; H04R 5/033; H04M 1/72412; H04M 1/6066
USPC ........................................................ 455/41.3
See application file for complete search history.

(56) References Cited

U.S. PATENT DOCUMENTS

| | | | |
|---|---|---|---|
| 2013/0316649 A1 | 11/2013 | Newham | |
| 2017/0012821 A1* | 1/2017 | Sa | ............ G06F 13/14 |
| 2017/0366924 A1 | 12/2017 | Thoen | |
| 2018/0083468 A1 | 3/2018 | Dennis | |
| 2020/0107127 A1* | 4/2020 | Gong | ...................... H04R 5/033 |

FOREIGN PATENT DOCUMENTS

| | | |
|---|---|---|
| CN | 104540175 A | 4/2015 |
| CN | 204669601 U | 9/2015 |
| CN | 105517186 A | 4/2016 |
| CN | 107071618 A | 8/2017 |

(Continued)

*Primary Examiner* — Eugene Yun
(74) *Attorney, Agent, or Firm* — Slater Matsil, LLP

(57) ABSTRACT

An electronic device establishes a first Bluetooth connection to a first wireless earbud, where there is a wireless connection between the first wireless earbud and a second wireless earbud. The electronic device establishes a second Bluetooth connection to the second wireless earbud by using the first wireless earbud. The electronic device simultaneously maintains the first Bluetooth connection and the second Bluetooth connection.

12 Claims, 24 Drawing Sheets

(56) References Cited

FOREIGN PATENT DOCUMENTS

| | | | |
|---|---|---|---|
| CN | 107529126 A | 12/2017 | |
| CN | 107708014 A | 2/2018 | |
| CN | 107885478 A | 4/2018 | |
| CN | 107894881 A | 4/2018 | |
| CN | 108345591 A | 7/2018 | |
| CN | 108419228 A | 8/2018 | |
| CN | 108462951 A | 8/2018 | |
| CN | 108810697 A | 11/2018 | |
| CN | 108810741 A | 11/2018 | |
| CN | 108881990 A | 11/2018 | |
| CN | 109495850 A * | 3/2019 | ............. G06F 3/162 |

\* cited by examiner

BLUETOOTH CONNECTION METHOD AND DEVICE

CROSS-REFERENCE TO RELATED APPLICATIONS

This application is a national stage of International Application No. PCT/CN2018/118783, filed on Nov. 30, 2018, which is hereby incorporated by reference in its entirety.

TECHNICAL FIELD

Embodiments of this application relate to the field of electronic technologies, and in particular, to a Bluetooth connection method and a device.

BACKGROUND

As users impose increasingly high requirements for headset convenience, and some manufacturers cancel headset jacks of electronic devices such as mobile phones, wireless headsets have been favored by more users. Particularly, a true wireless stereo (true wireless stereo, TWS) headset includes two earbuds, and the two earbuds do not need to be connected by a wire. Therefore, it is more convenient for a user to use.

SUMMARY

Embodiments of this application provide a Bluetooth connection method and a device, to establish a Bluetooth connection between an electronic device and each TWS earbud to perform data exchange based on the Bluetooth connection.

To achieve the foregoing objective, the following technical solutions are used in the embodiments of this application. According to a first aspect, a technical solution of this application provides a Bluetooth connection method applied to an electronic device and a pair of wireless earbuds, where the pair of wireless earbuds includes a first wireless earbud and a second wireless earbud. The method includes: The electronic device establishes a first Bluetooth connection to the first wireless earbud, where there is a wireless connection between the first wireless earbud and the second wireless earbud. The electronic device establishes a second Bluetooth connection to the second wireless earbud by using the first wireless earbud. The electronic device simultaneously maintains the first Bluetooth connection and the second Bluetooth connection.

In this solution, for the first wireless earbud and the second wireless earbud that are used in pairs, the electronic device may first establish the Bluetooth connection to the first wireless earbud, and implement a dual-channel connection (or referred to as a dual-feed connection) by using a medium effect of the first wireless earbud.

In a possible implementation, the method further includes: The electronic device sends audio data to the first wireless earbud through the first Bluetooth connection; and the electronic device sends the audio data to the second wireless earbud through the second Bluetooth connection.

In other words, after the dual-feed connection is implemented, the electronic device may exchange an audio signal separately with the first wireless earbud and the second wireless earbud through Bluetooth connection channels between the electronic device and the first wireless earbud and between the electronic device and the second wireless earbud.

In another possible implementation, before the electronic device establishes the second Bluetooth connection to the second wireless earbud, the method further includes: The electronic device receives, from the first wireless earbud, information indicating that the second wireless earbud and the first wireless earbud are used in pairs.

In this way, the electronic device can perform the Bluetooth connection with the second wireless earbud after learning that the second wireless earbud and the first wireless earbud are used in pairs.

In another possible implementation, before the electronic device establishes the second Bluetooth connection to the second wireless earbud, the method further includes: The electronic device receives first identification information sent by the first wireless earbud, where the first identification information indicates that the first wireless earbud and the second wireless earbud of the pair of wireless earbuds are in support of simultaneously maintaining the Bluetooth connections to the electronic device. The electronic device sends second identification information to the first wireless earbud, where the second identification information indicates that the electronic device is in support of simultaneously maintaining the Bluetooth connections to the two wireless earbuds of the pair of wireless earbuds.

In this way, the first wireless earbud and the electronic device can perform a dual-feed connection procedure after learning that the other party supports a dual-feed mode.

In another possible implementation, that the electronic device sends second identification information to the first wireless earbud includes: The electronic device displays an identifier of the first wireless earbud; and the electronic device sends the second identification information to the first wireless earbud after detecting an operation performed by a user on the identifier.

After the user performs the operation on the identifier, it may indicate that the user wants to use the wireless earbuds and connect the electronic device to the wireless earbuds. In this case, the electronic device notifies the first wireless earbud that the electronic device supports the dual-feed mode, and then the first wireless earbud notifies the second wireless earbud that the second wireless earbud can be connected to the electronic device, so that the subsequent dual-feed connection procedure can be performed.

In another possible implementation, the first identification information and the second identification information may be universally unique identifiers (universally unique identifier, UUID).

In another possible implementation, the electronic device sends the second identification information to the first wireless earbud by using a Bluetooth low energy (Bluetooth low energy, BLE) message. For example, the BLE message may be a BLE non-connectable broadcast message.

According to a second aspect, a technical solution of this application provides a Bluetooth connection method applied to a pair of wireless earbuds and an electronic device, where the pair of wireless earbuds includes a first wireless earbud and a second wireless earbud. The method includes: The first wireless earbud establishes a wireless connection to the second wireless earbud, where the first wireless earbud and the second wireless earbud are used in pairs. The first wireless earbud establishes a first Bluetooth connection to the electronic device. The first wireless earbud sends information about the second wireless earbud to the electronic device, and sends information about the electronic device to the second wireless earbud, so that the second wireless earbud and the electronic device establish a second Bluetooth connection. The second wireless earbud and the electronic device establish the Bluetooth connection. The first Bluetooth connection and the second Bluetooth connection are simultaneously maintained.

In this solution, for the first wireless earbud and the second wireless earbud that are used in pairs, the first wireless earbud may first establish the Bluetooth connection to the electronic device, and then indicate the information about the electronic device and the information about the second wireless earbud respectively to the second wireless earbud and the electronic device, so that the second wireless earbud and the electronic device establish the Bluetooth connection, thereby implementing a dual-channel connection (or referred to as a dual-feed connection).

In a possible implementation, before the first wireless earbud sends the information about the electronic device to the second wireless earbud, the method further includes: The first wireless earbud sends first identification information to the electronic device, where the first identification information indicates that the first wireless earbud and the second wireless earbud of the pair of wireless earbuds are in support of simultaneously maintaining the Bluetooth connections to the electronic device. The first wireless earbud receives second identification information sent by the electronic device, where the second identification information indicates that the electronic device is in support of simultaneously maintaining the Bluetooth connections to the two wireless earbuds of the pair of wireless earbuds.

In other words, the first wireless earbud and the electronic device may first indicate to each other that they support the dual-feed mode, and then perform a dual-feed connection procedure.

In another possible implementation, that the first wireless earbud sends first identification information to the electronic device includes: The first wireless earbud sends the first identification information to the electronic device by using a Bluetooth low energy BLE non-connectable broadcast message or a Bluetooth low energy BLE connectable broadcast message.

In another possible implementation, after the first wireless earbud establishes the wireless connection to the second wireless earbud, and before the first wireless earbud sends the information about the electronic device to the second wireless earbud, the method further includes: The second wireless earbud enters a non-connectable undiscoverable state.

In this way, the second wireless earbud that enters a connectable discoverable state and the electronic device can establish the second Bluetooth connection.

In another possible implementation, after the second wireless earbud and the electronic device establish the second Bluetooth connection, the method further includes: removing the wireless connection between the first wireless earbud and the second wireless earbud.

After the dual-feed connection is established, the electronic device may communicate with the first wireless earbud and the second wireless earbud respectively by using the first Bluetooth connection and the second Bluetooth connection, without requiring the wireless connection between the first wireless earbud and the second wireless earbud. Therefore, the wireless connection can be removed.

According to a third aspect, a technical solution of this application provides a Bluetooth connection apparatus. The apparatus is included in an electronic device, and the apparatus has a function of implementing behaviors of the electronic device in the method according to any one of the first aspect or the possible implementations of the first aspect. The function may be implemented by using hardware, or may be implemented by hardware executing corresponding software. The hardware or software includes one or more modules or units corresponding to the function, for example, an enabling module or unit, an establishment module or unit, and an interaction module or unit.

According to a fourth aspect, a technical solution of this application provides a Bluetooth connection apparatus. The apparatus is included in a first wireless earbud, and the apparatus has a function of implementing behaviors of the first wireless earbud in the method according to any one of the second aspect or the possible implementations of the second aspect. The function may be implemented by using hardware, or may be implemented by hardware executing corresponding software. The hardware or software includes one or more modules or units corresponding to the function, for example, an earbud connection module or unit, an electronic device connection module or unit, and a dual-feed connection module or unit.

According to a fifth aspect, a technical solution of this application provides a Bluetooth connection apparatus. The apparatus is included in a second wireless earbud, and the apparatus has a function of implementing behaviors of the second wireless earbud in the method according to any one of the second aspect or the possible implementations of the second aspect. The function may be implemented by using hardware, or may be implemented by hardware executing corresponding software. The hardware or software includes one or more modules or units corresponding to the function, for example, an establishment module or unit and a processing module or unit.

According to a sixth aspect, a technical solution of this application provides a Bluetooth connection apparatus. The apparatus is included in a wireless device, the wireless device includes a first wireless earbud and a second wireless earbud, and the apparatus has a function of implementing behaviors of the wireless device in the method according to any one of the second aspect or the possible implementations of the second aspect. The function may be implemented by using hardware, or may be implemented by hardware executing corresponding software. The hardware or software includes one or more modules or units corresponding to the function.

For example, the wireless device may be a TWS headset.

According to a seventh aspect, a technical solution of this application provides a pair of wireless earbuds. The pair of wireless earbuds may include the first wireless earbud and the second wireless earbud according to any possible implementation of any aspect.

According to an eighth aspect, a technical solution of this application provides a system. The system may include the electronic device, the first wireless earbud, and the second wireless earbud according to any possible implementation of any aspect. In a possible implementation, in a process in which the electronic device is connected to the first wireless earbud, the electronic device and the first wireless earbud may simultaneously perform discovery by using a Bluetooth low energy BLE message and a basic rate (basic rate, BR)/enhanced data rate (enhanced data rate, EDR). After discovering the first wireless earbud, the electronic device may display an identifier. After the electronic device detects an operation performed by a user on the identifier, if the electronic device supports the dual-feed mode, the electronic device may establish a Bluetooth connection to the second wireless earbud by using the first wireless earbud, to implement a dual-feed connection. If the electronic device does not support the dual-feed mode, a connection procedure of a listening, forwarding, or NFMI solution, or the like may be performed.

According to a ninth aspect, a technical solution of this application provides an electronic device, including one or more processors and one or more memories. The one or more memories are coupled to the one or more processors. The one or more memories are configured to store computer program code, where the computer program code includes computer instructions. When the one or more processors execute the computer instructions, the electronic device is enabled to perform the Bluetooth connection method according to any one of the possible implementations of the first aspect or the possible implementations of the second aspect.

According to a tenth aspect, a technical solution of this application provides a computer storage medium, including computer instructions. When the computer instructions are run on an electronic device, the electronic device is enabled to perform the Bluetooth connection method according to any one of the possible implementations of the first aspect or the possible implementations of the second aspect.

According to an eleventh aspect, a technical solution of this application provides a computer program product. When the computer program product is run on a computer, an electronic device is enabled to perform the Bluetooth connection method according to any one of the possible implementations of the first aspect or the possible implementations of the second aspect.

DETAILED DESCRIPTION OF ILLUSTRATIVE EMBODIMENTS

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

Figure 1:
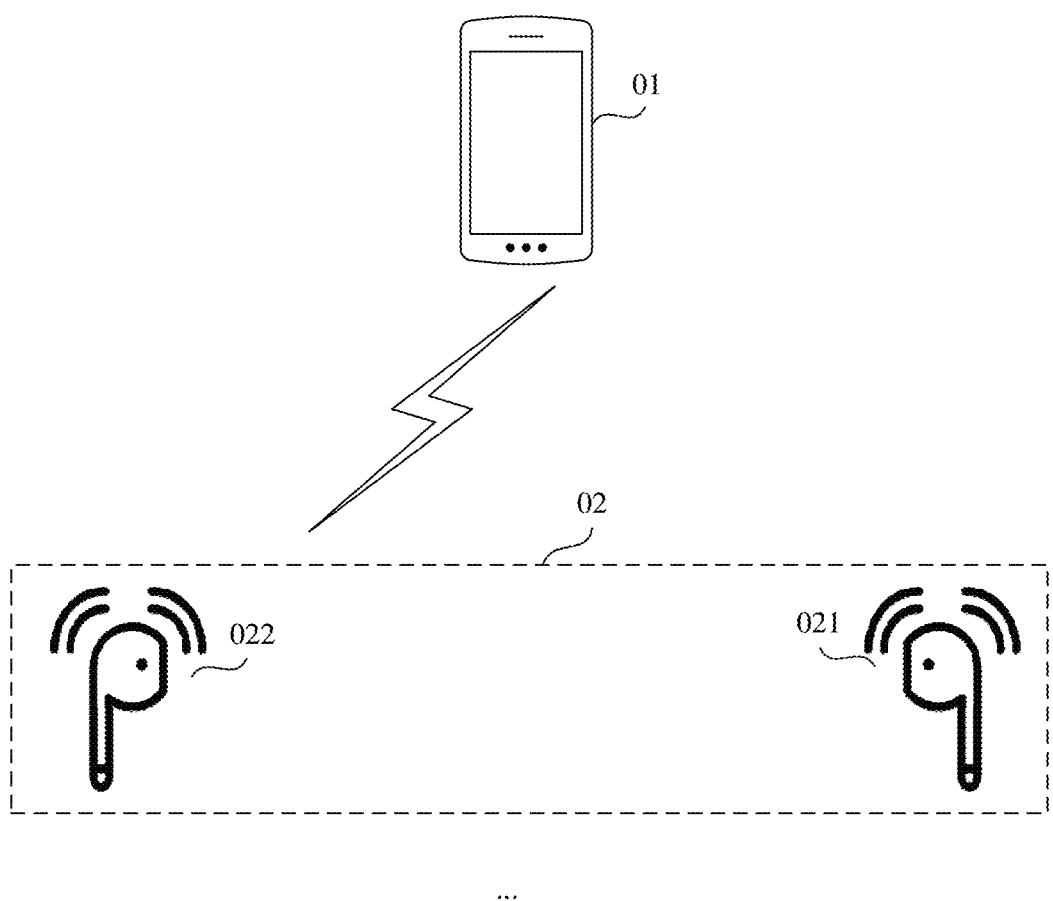
FIG. 1 is a schematic diagram of a system according to an embodiment of this application.

An embodiment of this application provides a pairing connection method. As shown in FIG. 1, the method can be applied to a system including an electronic device 01 and at least one external device 02. In this system, the electronic device 01 and the external device 02 are connected to each other in a wireless manner. The wireless manner may be a Bluetooth (Bluetooth, BT) connection, a wireless fidelity (wireless fidelity, Wi-Fi) network connection, a global navigation satellite system (global navigation satellite system, GNSS) connection, a frequency modulation (frequency modulation, FM) connection, a near field communication (near field communication, NFC) connection, an infrared (infrared, IR) connection, or the like. For example, the electronic device 01 may be a device such as a mobile phone, a media player (for example, an MP3 or an MP4), a tablet computer, a notebook computer, an ultra-mobile personal computer (ultra-mobile personal computer, UMPC), a personal digital assistant (personal digital assistant, PDA), a television set, or a smartwatch. For example, the external device 02 may be a wireless-earbud headset, a wireless speaker, a wireless hand ring, a wireless vehicle-mounted device, wireless smart glasses, or an augmented reality (augmented reality, AR)/virtual reality (virtual reality, VR) device. This is not limited in this embodiment of this application. The wireless headset may be a head-mounted wireless headset, an in-ear wireless headset, or another portable listening device.

The external device 02 may include a first body 021 and a second body 022 that are used in pairs, where the first body 021 and the second body 022 cooperate with each other to work together. For example, the external device 02 may be an in-ear TWS headset, and the TWS headset may include a left earbud (usually marked with "L") and a right earbud (usually marked with "R") that are used in pairs. The left earbud and the right earbud are configured to play stereo, where the left earbud may be configured to play a left channel signal of audio data, and the right earbud may be configured to synchronously play a right channel signal of the audio data. For another example, the external device 02 may be a wireless speaker, and the wireless speaker may include a left channel speaker and a right channel speaker that are used in pairs. The left channel speaker may be configured to play a left channel signal of audio data, and the right channel speaker may be configured to synchronously play a right channel signal of the audio data.

In the system shown in FIG. 1, an example is used for description in which the electronic device 01 is a mobile phone, the external device 02 is an in-ear TWS headset, and the first body 021 and the second body 022 are right and left earbuds of the TWS headset. It can be understood that the electronic device 01 and the external device 02 in the system may alternatively be other devices. This is not limited in this embodiment of this application.

Figure 2:
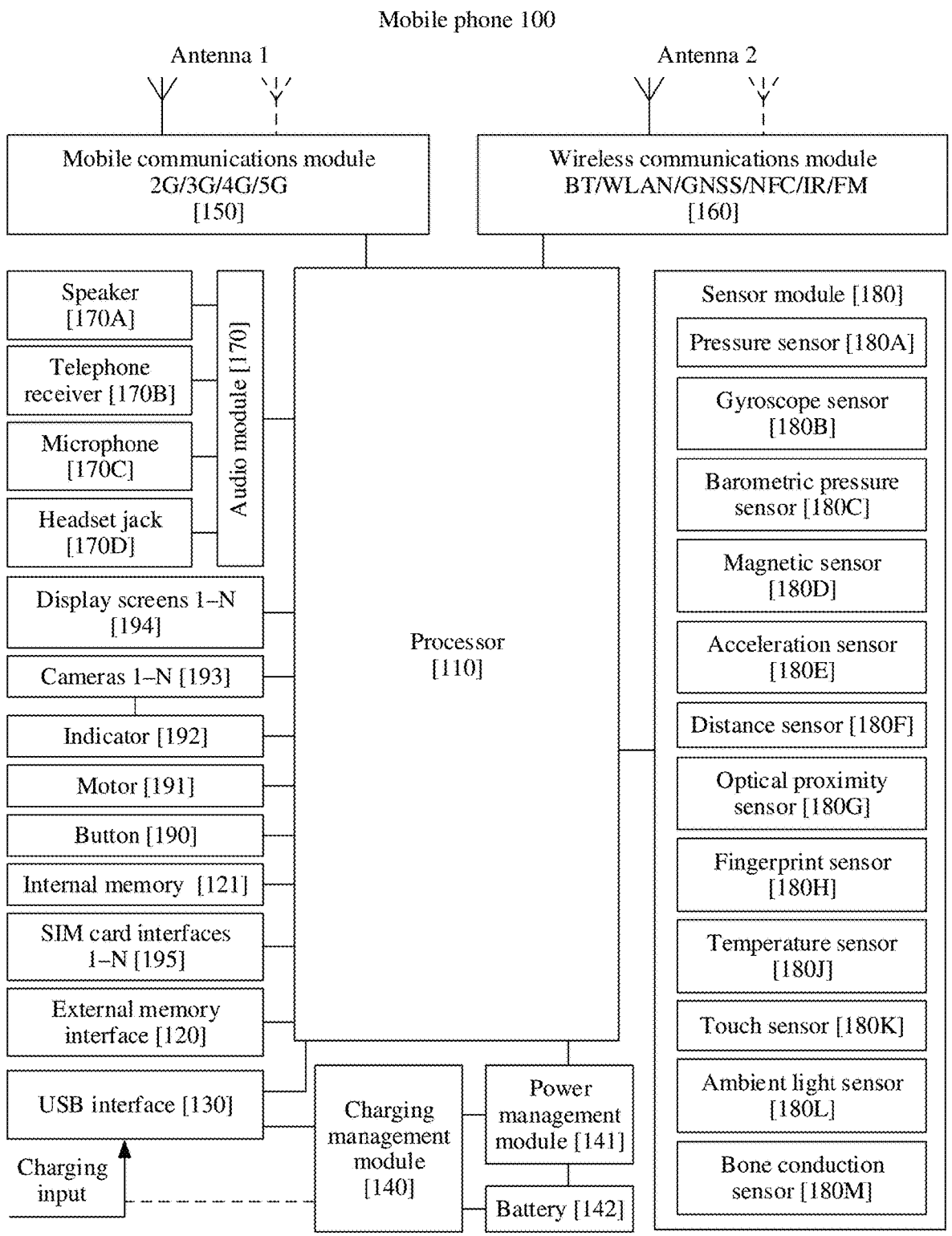
FIG. 2 is a schematic structural diagram of a mobile phone according to an embodiment of this application.

For example, the electronic device 01 is a mobile phone 100. FIG. 2 is a schematic structural diagram of the mobile phone 100. The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the mobile phone 100. In some other embodiments of this application, the mobile phone 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent components, or may be integrated into one or more processors.

The controller may be a nerve center and a command center of the mobile phone 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to reuse the instruction or the data, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the mobile phone 100. The processor 110 communicates with the display 194 through the DSI interface, to implement a display function of the mobile phone 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the mobile phone 100, or may be configured to transmit data between the mobile phone 100 and an external device, or may be configured to connect to a headset for playing audio by using the headset. The interface may be further configured to connect to another mobile phone such as an AR device.

It may be understood that an interface connection relationship between the modules illustrated in the embodiments of this application is merely an example for description, and does not constitute a limitation on the structure of the mobile phone 100. In some other embodiments of this application, the mobile phone 100 may alternatively use an interface connection manner different from that in the foregoing embodiments, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface. In some embodiments of wireless charging, the charging management module 140 may receive wireless charging input by using a wireless charging coil of the mobile phone 100. The charging management module 140 supplies power to the mobile phone by using the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile phone 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the mobile phone 100 may be configured to cover one or more communication bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the mobile phone 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a wireless communication solution that includes a wireless local area network (wireless local area networks, WLAN) (for example, a wireless fidelity (wireless fidelity, Wi-Fi)

network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the mobile phone 100. The wireless communications module 160 may be one or more devices integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

For example, in this embodiment of this application, the mobile phone 100 may establish a wireless connection to the external device through the wireless communications module 160 by using the wireless communications technology such as Bluetooth (BT). Based on the established wireless connection, the mobile phone 100 may send audio data to the external device, and may further receive audio data from the external device.

In some embodiments, in the mobile phone 100, the antenna 1 and the mobile communications module 150 are coupled, and the antenna 2 and the wireless communications module 160 are coupled, so that the mobile phone 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The mobile phone 100 implements a display function by using the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), mini-LED, a micro-LED, a micro-OLED, a quantum dot light emitting diode (quantum dot light emitting diodes, QLED), or the like. In some embodiments, the mobile phone 100 may include one or N displays 194, where N is a positive integer greater than 1.

The mobile phone 100 may implement a shooting function by using the ISP, the camera 193, the video codec, the GPU, the display 194, the application processor, and the like.

The ISP is configured to process data fed back by the camera 193. For example, during photographing, a shutter is pressed, a ray of light is transmitted to a light-sensitive element of the camera through a lens, and an optical signal is converted into an electrical signal. The light-sensitive element of the camera transmits the electrical signal to the ISP for processing, and converts the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the mobile phone 100 may include one or N cameras 193, where N is a positive integer greater than 1.

The digital signal processor is configured to process a digital signal, and may process other digital signals in addition to the digital image signal. For example, when the mobile phone 100 selects a frequency, the digital signal processor is configured to perform Fourier transform on frequency energy, and the like.

The video codec is configured to compress or decompress a digital video. The mobile phone 100 may support one or more video codecs. In this way, the mobile phone 100 can play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the mobile phone 100, such as image recognition, facial recognition, voice recognition, and text understanding, can be implemented by using the NPU.

The external memory interface 120 may be configured to connect to an external storage card such as a micro SD card, to extend a storage capability of the mobile phone 100. The external storage card communicates with the processor 110 through the external memory interface 120, to implement a data storage function. For example, files such as music and a video are stored in the external storage card.

The internal memory 121 may be configured to store computer-executable program code, and the executable program code includes instructions. The processor 110 runs the instructions stored in the internal memory 121, to perform various function applications of the mobile phone 100 and data processing. For example, in this embodiment of this application, the processor 110 may execute the instructions stored in the internal memory 121, to establish the wireless pairing connection to each of the two bodies of the external device through the wireless communications module 160, and perform short-range data exchange with the external device, to implement functions such as calling and music playing through the external device. The internal memory 121 may include a program storage area and a data storage area. The program storage area may store an operating system, an application required by at least one function (for example, a voice playing function or an image playing function), and the like. The data storage area may store data (for example, audio data or an address book) created during use of the mobile phone 100, and the like. In addition, the internal memory 121 may include a high-speed random access memory, and may further include a nonvolatile memory, for example, at least one magnetic disk storage device, a flash memory device, or a universal flash storage (universal flash storage, UFS).

In this embodiment of this application, the mobile phone 100 may establish a wireless connection to each of the two bodies of the external device by using a wireless communications technology (for example, Bluetooth). For example, the mobile phone 100 first establishes a wireless connection to the first body, and then establishes a wireless connection between the mobile phone 100 and the second body by using the first body. After establishing the wireless connections, the mobile phone 100 may store a Bluetooth address of the external device in the internal memory 121. In some embodiments, when the external device is a device including two bodies, for example, a TWS headset, and left and right earbuds of the TWS headset have respective Bluetooth addresses, the mobile phone 100 may store the Bluetooth addresses of the left and right earbuds of the TWS headset in the internal memory 121 in an associated manner, so that the left and right earbuds of the TWS headset can be used as a pair of devices.

The mobile phone 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an electrical audio signal into a sound signal. The mobile phone 100 may listen to music or answer a hands-free call through the speaker 170A.

The receiver 170B, also referred to as an "earpiece", is configured to convert an electrical audio signal into a sound signal. When a call is answered or voice information is received by using the mobile phone 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound near the microphone 170C, to input a sound signal to the microphone 170C. At least one microphone 170C may be disposed in the mobile phone 100. In some other embodiments, two microphones 170C may be disposed in the mobile phone 100, to collect a sound signal and further implement a noise reduction function. In some other embodiments, three, four, or more microphones 170C may alternatively be disposed in the mobile phone 100, to collect a sound signal, reduce noise, further identify a sound source, implement a directional recording function, and the like.

The headset jack 170D is configured to connect to a wired headset. The headset jack 170D may be a USB interface 130, a 3.5 mm open mobile terminal platform (open mobile terminal platform, OMTP) standard interface, or a cellular telecommunications industry association of the USA (cellular telecommunications industry association of the USA, CTIA) standard interface.

In this embodiment of this application, when the wireless connection is established between the mobile phone 100 and the external device, for example, the TWS headset, the TWS headset may be used as an audio input/output device of the mobile phone 100. For example, the audio module 170 may receive an audio electrical signal transmitted by the wireless communications module 160, to implement functions such as call answering and music playing by using the TWS headset. For example, in a process in which the user makes a call, the TWS headset may collect a sound signal of the user, convert the sound signal into an audio electrical signal, and send the audio electrical signal to the wireless communications module 160 of the mobile phone 100. The wireless communications module 160 transmits the electrical audio signal to the audio module 170. The audio module 170 may convert the received electrical audio signal into a digital audio signal, encode the digital audio signal, and then transfer an encoded digital audio signal to the mobile communications module 150. The mobile communications module 150 transmits the encoded digital audio signal to a peer device of the call, to implement the call. For another example, when the user plays music by using the media player of the mobile phone 100, the application processor may transmit, to the audio module 170, an audio electrical signal corresponding to the music played by the media player. The audio module 170 transmits the electrical audio signal to the wireless communications module 160. The wireless communications module 160 may send the audio electrical signal to the TWS headset, so that the TWS headset converts the audio electrical signal into a sound signal for playing.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile phone 100 determines pressure intensity based on a capacitance change. When a touch operation is performed on the display 194, the mobile phone 100 detects intensity of the touch operation by using the pressure sensor 180A. The mobile phone 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an SMS message application icon, an instruction for creating a new SMS message is executed.

The gyroscope sensor 180B may be configured to determine a moving posture of the mobile phone 100. In some embodiments, an angular velocity of the mobile phone 100 around three axes (namely, x, y, and z axes) may be determined by using the gyroscope sensor 180B. The gyroscope sensor 180B may be configured to implement image stabilization during photographing. For example, when a shutter is pressed, the gyroscope sensor 180B detects an angle at which the mobile phone 100 jitters, obtains, through calculation based on the angle, a distance for which a lens module needs to compensate, and allows a lens to cancel the jitter of the mobile phone 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the mobile phone 100 calculates an altitude by using the barometric pressure measured by the barometric pressure sensor 180C, to assist in positioning and navigation.

The magnetic sensor 180D includes a Hall sensor. The mobile phone 100 may detect opening and closing of a flip leather case by using the magnetic sensor 180D. In some embodiments, when the mobile phone 100 is a clamshell phone, the mobile phone 100 may detect opening/closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect values of acceleration in various directions (usually on three axes) of the mobile phone 100. When the mobile phone 100 is still, a value and a direction of gravity may be detected. The acceleration sensor 180E may be further configured to identify a posture of the mobile phone, and is applied to an application such as switching between landscape mode and portrait mode or a pedometer.

The distance sensor 180F is configured to measure a distance. The mobile phone 100 may measure a distance through infrared light or a laser. In some embodiments, in a shooting scenario, the mobile phone 100 may measure a distance by using the distance sensor 180F, to implement fast focusing.

The optical proximity sensor 180G may include a light emitting diode (LED) and an optical detector, for example, a photodiode. The light-emitting diode may be an infrared light-emitting diode. The mobile phone 100 emits infrared light through the light-emitting diode. The mobile phone 100 detects infrared reflected light from a nearby object by using the photodiode. When sufficient reflected light is detected, the mobile phone 100 may determine that there is an object near the mobile phone 100. When insufficient reflected light is detected, the mobile phone 100 may determine that there is no object near the mobile phone 100. The mobile phone 100 may detect, by using the optical proximity sensor 180G, that the user holds the mobile phone 100 close to an ear to make a call, so as to automatically turn off a screen for power saving. The optical proximity sensor 180G may also be used in a smart cover mode or a pocket mode to automatically unlock or lock the screen.

The ambient light sensor 180L is configured to sense ambient light brightness. The mobile phone 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the mobile phone 100 is in a pocket to prevent an accidental touch.

The fingerprint sensor 180H is configured to collect a fingerprint. The mobile phone 100 may use a feature of the collected fingerprint to implement fingerprint unlocking, application access locking, fingerprint shooting, fingerprint call answering, and the like.

The temperature sensor 180J is configured to detect a temperature. In some embodiments, the mobile phone 100 executes a temperature processing policy based on the temperature detected by the temperature sensor 180J. For example, when the temperature reported by the temperature sensor 180J exceeds a threshold, the mobile phone 100 lowers performance of a processor near the temperature sensor 180J, to reduce power consumption for thermal protection. In some other embodiments, when the temperature is lower than another threshold, the mobile phone 100 heats the battery 142 to prevent the mobile phone 100 from being shut down abnormally because of a low temperature. In some other embodiments, when the temperature is lower than still another threshold, the mobile phone 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the mobile phone 100 and is at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a speech signal through parsing based on a vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The buttons 190 include a power button, a volume button, and the like. The button 190 may be a mechanical button, or or may be a touch-sensitive button. The mobile phone 100 receives a key input, and generates a key signal input related to a user setting and function control of the mobile phone 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the mobile phone 100. The mobile phone 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 may be compatible with different types of SIM cards. The SIM card interface 195 may be further compatible with an external memory card. The mobile phone 100 interacts with a network by using the SIM card, to implement functions such as calling and data communication. In some embodiments, the mobile phone 100 uses an eSIM, namely, an embedded SIM card. The eSIM card may be embedded in the mobile phone 100, and cannot be separated from the mobile phone 100.

Figure 3A:
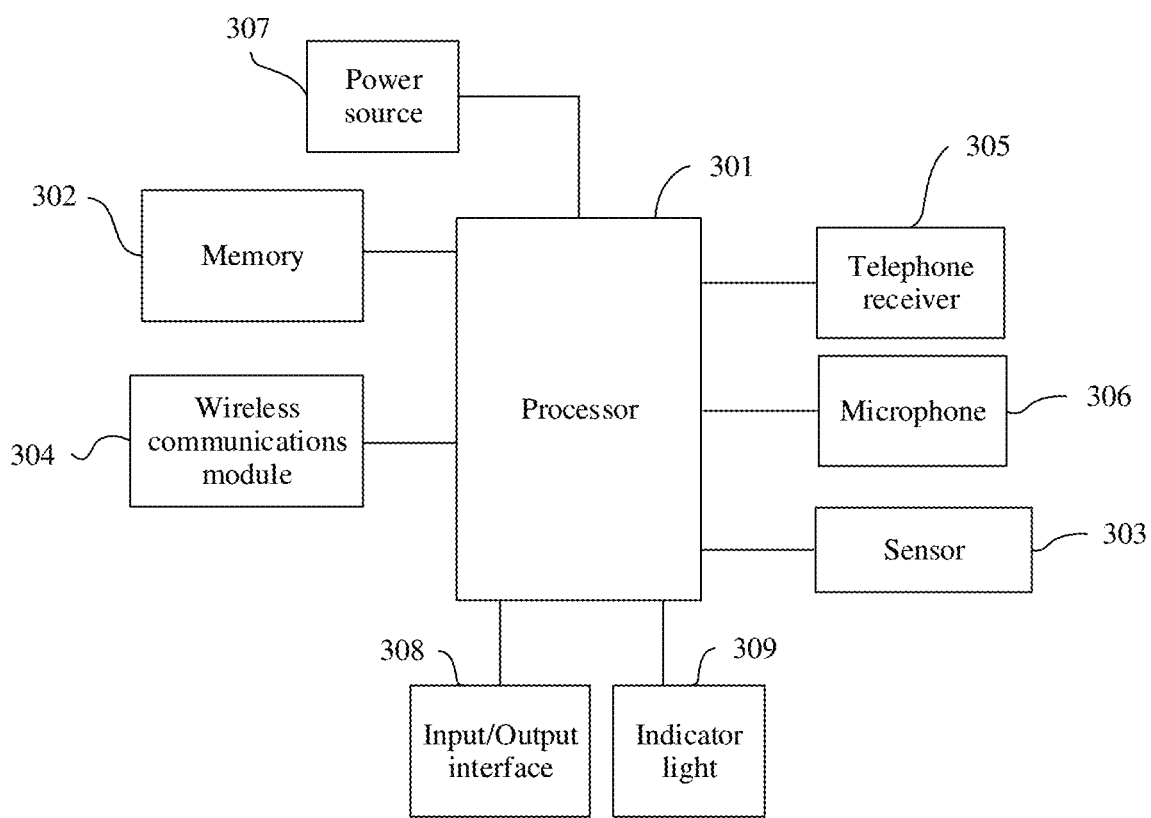
FIG. 3A is a schematic structural diagram of an earbud according to an embodiment of this application.

For example, when the external device 02 is a TWS headset, FIG. 3A is a schematic structural diagram of a body, that is, an earbud (a left earbud or a right earbud), of a TWS headset. As shown in FIG. 3A, the earbud of the TWS headset may include a processor 301, a memory 302, a sensor 303, a wireless communications module 304, a telephone receiver 305, a microphone 306, and a power source 307.

The memory 302 may be configured to store application program code, for example, application program code used for establishing a wireless connection to the other earbud of the TWS headset and enabling the earbud to perform a pairing connection with the electronic device 01.

The processor 301 may execute the application program code to implement a function of the earbud of the TWS headset in this embodiment of this application, for example, implement a wireless pairing connection between each earbud of the TWS headset and the electronic device 01.

The memory 302 may further store a Bluetooth address used to uniquely identify the earbud, and store a Bluetooth address of the other earbud of the TWS headset. In addition, the memory 302 may further store a pairing history of the electronic device 01 that has been successfully paired with the earbud before. For example, the pairing history may include a Bluetooth address of the electronic device 01 that has been successfully paired with the earbud. Based on the pairing history, the earbud can automatically be connected to the electronic device 01 that has been paired with the earbud. The Bluetooth addresses may be media access control (media access control, MAC) addresses.

The sensor 303 may be a distance sensor or an optical proximity sensor. The earbud may determine, by using the sensor 303, whether the earbud is worn by a user. For example, the earbud may detect, by using the optical proximity sensor, whether there is an object near the earbud, to determine whether the earbud is worn by a user. When determining that the earbud is worn, the earbud may start the telephone receiver 305. In some embodiments, the earbud may further include a bone conduction sensor, and the bone conduction sensor and the earbud are combined into a bone conduction headset. The earbud may obtain a voice signal by parsing a vibration signal of a vibrating bone block of a vocal-cord part obtained by the bone conduction sensor, to implement a voice function. In some other embodiments, the earbud may further include a touch sensor, configured to detect a touch operation performed by the user. In still some other embodiments, the earbud may further include a fingerprint sensor, configured to detect the user's fingerprints, identify a user identity, and the like. In yet some other embodiments, the earbud may further include an ambient light sensor, and the earbud may adaptively adjust some parameters such as a volume based on sensed ambient light brightness.

The wireless communications module 304 is configured to support wireless data exchange between the current earbud and the other earbud of the TWS headset, and between the current earbud and the electronic devices 01. In some embodiments, the wireless communications module 304 may be a Bluetooth transceiver. The earbud of the TWS headset may establish a wireless connection to the electronic device 01 by using the Bluetooth transceiver, to implement short-range data exchange between the earbud and the electronic device 01.

The at least one telephone receiver 305, which may also be referred to as an "earpiece", may be configured to convert an audio electrical signal into a sound signal and play the sound signal. For example, when the earbud of the TWS headset is used as an audio output device of the electronic device 01, the telephone receiver 305 may convert the received audio electrical signal into the sound signal and play the sound signal.

The at least one microphone 306, which may also be referred to as a "mic" or a "mike", is configured to convert a sound signal into an audio electrical signal. For example, when the earbud of the TWS headset is used as an audio input device of the electronic device 01, when the user speaks (for example, makes a call or sends a voice message), the microphone 306 may collect a sound signal of the user and convert the sound signal into an audio electrical signal. The audio electrical signal is the audio data in this embodiment of this application.

The power source 307 may be configured to supply power to the components included in the earbud of the TWS headset. In some embodiments, the power source 307 may be a battery such as a rechargeable battery.

Figure 3B:
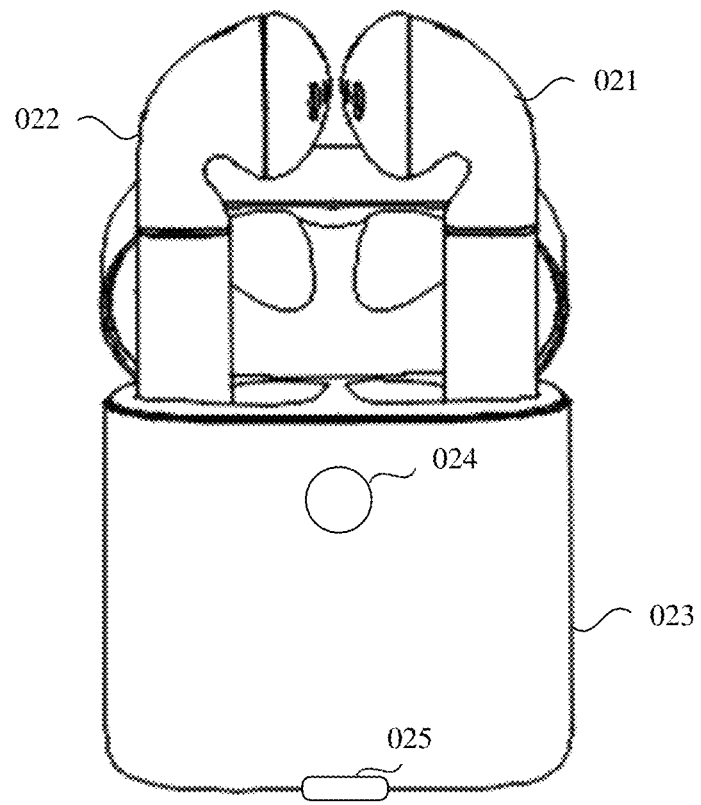
FIG. 3B is a schematic diagram of an earbud and a headset box according to an embodiment of this application.

The TWS headset is usually provided with a headset box (for example, a headset box 023 shown in FIG. 3B). The headset box may be configured to store the left earbud and the right earbud of the TWS headset. For example, with reference to FIG. 3A, as shown in FIG. 3B, the headset box 023 may be configured to store a left earbud 022 and a right earbud 021 of the TWS headset. In some embodiments, at least one touch control 024 may be disposed on the headset box 023, and may be configured to trigger the TWS headset and a new electronic device 01 to perform pairing, or trigger the two earbuds of the TWS headset to perform pairing again, or the like. A charging port 025 may further be disposed on the headset box 023, and is configured to charge the headset box. It can be understood that the headset box 023 may further include other controls, and details are not described herein. In addition, the headset box 023 may further charge the left earbud and the right earbud of the TWS headset. Correspondingly, in some embodiments, the earbud of the TWS headset may further include an input/output interface 308.

The input/output interface 308 may be configured to provide any wired connection between the earbud of the TWS headset and the headset box (for example, the headset box 023). In some embodiments, the input/output interface 308 may be an electrical connector. When the earbud of the TWS headset is placed in the headset box, the earbud of the TWS headset may be electrically connected to the headset box (for example, an input/output interface included in the headset box) through the electrical connector. After the electrical connection is established, the headset box may charge the power source 307 of the earbud of the TWS headset. After the electrical connection is established, the earbud of the TWS headset may further perform data communication with the headset box. For example, the earbud of the TWS headset may receive a pairing command from the headset box through the electrical connector. The pairing command is used to instruct the earbud of the TWS headset to start the wireless communications module 304, so that the earbud of the TWS headset can perform a pairing connection with the electronic device 01 by using a corresponding wireless communication protocol (for example, Bluetooth).

Certainly, the earbud of the TWS headset may alternatively not include the input/output interface 308. In this case, the earbud may implement a charging or data communication function based on a wireless connection that is established between the earbud and the headset box by using the wireless communications module 304.

In addition, in some embodiments, the headset box (for example, the headset box 023) may further include components such as a processor and a memory. The memory may be configured to store application program code, and the processor of the headset box controls the application program code to be executed, to implement a function of the headset box. For example, when the user opens a box cover of the headset box, in response to an operation performed by the user for opening the box cover, the processor of the headset box may execute the application program code stored in the memory, to send the pairing command and the like to the earbud of the TWS headset.

It can be understood that the structure illustrated in this embodiment of this application does not constitute any specific limitation on the earbud of the TWS headset. The earbud may include more or fewer components than those shown in FIG. 3A, a combination of two or more components, or a different arrangement of the components. For example, the earbud may further include components such as an indicator light 309 (which may indicate a status such as a quantity of electricity of the earbud), a display screen 310 (which may prompt the user with related information), an air filter (which may be used in cooperation with the earpiece), and a motor. Various components shown in FIG. 3A may be implemented by using hardware including one or more signal processors or application-specific integrated circuits, software, or a combination of hardware and software.

Figure 3C:
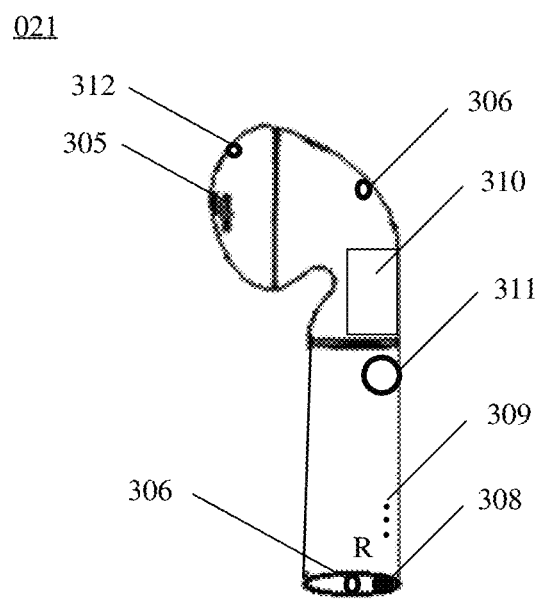
FIG. 3C is a schematic diagram of an earbud according to an embodiment of this application.

For example, FIG. 3C provides a schematic structural diagram of the earbud 021. The earbud 021 may include the telephone receiver 305, the microphone 306, the input/output interface 308, the indicator light 309, the display screen 310, a touch key 311, an optical proximity sensor 312, and the like. The touch key 311 is used in cooperation with the touch sensor, and is configured to trigger operations such as pause, playing, recording, turning on a MIC, and turning off the MIC.

It should be noted that structures of the left earbud and the right earbud of the TWS headset may be the same. For example, both the left earbud and the right earbud of the TWS headset may include the components shown in FIG. 3A. Alternatively, structures of the left earbud and the right earbud of the TWS headset may be different. For example, an earbud (for example, the right earbud) of the TWS headset may include the components shown in FIG. 3A, while the other earbud (for example, the left earbud) may include the components shown in FIG. 3A except the microphone 306.

It should also be noted that the structures shown in FIG. 3A, FIG. 3B, and FIG. 3C are merely used as examples for description, and do not constitute any limitation on structures or functions of the TWS headset and the headset box.

In the following embodiments of this application, the pairing connection method provided in this embodiment of this application is described by using an example in which the electronic device 01 is a mobile phone, the external device 02 is a TWS headset, and the mobile phone 01 and the TWS headset 02 establish a connection in a Bluetooth manner.

The TWS headset may exchange audio (audio) data with the mobile phone by using the Bluetooth connection between the TWS headset and the mobile phone, where the audio data may include media (media) data, voice (voice) data, and the like. For example, the TWS headset may play media data such as sound in music, recording, and video files for the user. In a phone call, audio call, or video call scenario, the TWS headset may play an incoming call alert tone and voice data of a peer end of a call, collect voice data of the user, and send the voice data of the user to the mobile phone. In a game scenario, the TWS headset may play background music, a game alert tone, voice data of a teammate, and the like, collect voice data of the user, and send the voice data of the user to the mobile phone. In a WeChat voice message scenario, the TWS headset may play a voice message, collect voice data recorded by the user, and send the recorded voice data to the mobile phone. In a voice assistant scenario or the like, the TWS headset may collect voice data of the user, and send the voice data of the user to the mobile phone.

At present, solutions for a Bluetooth connection between the TWS headset and the mobile phone mainly include a listening solution, a forwarding solution, a near-field magnetic induction (near-field magnetic induction, NFMI) solution, and the like.

Figure 4A:
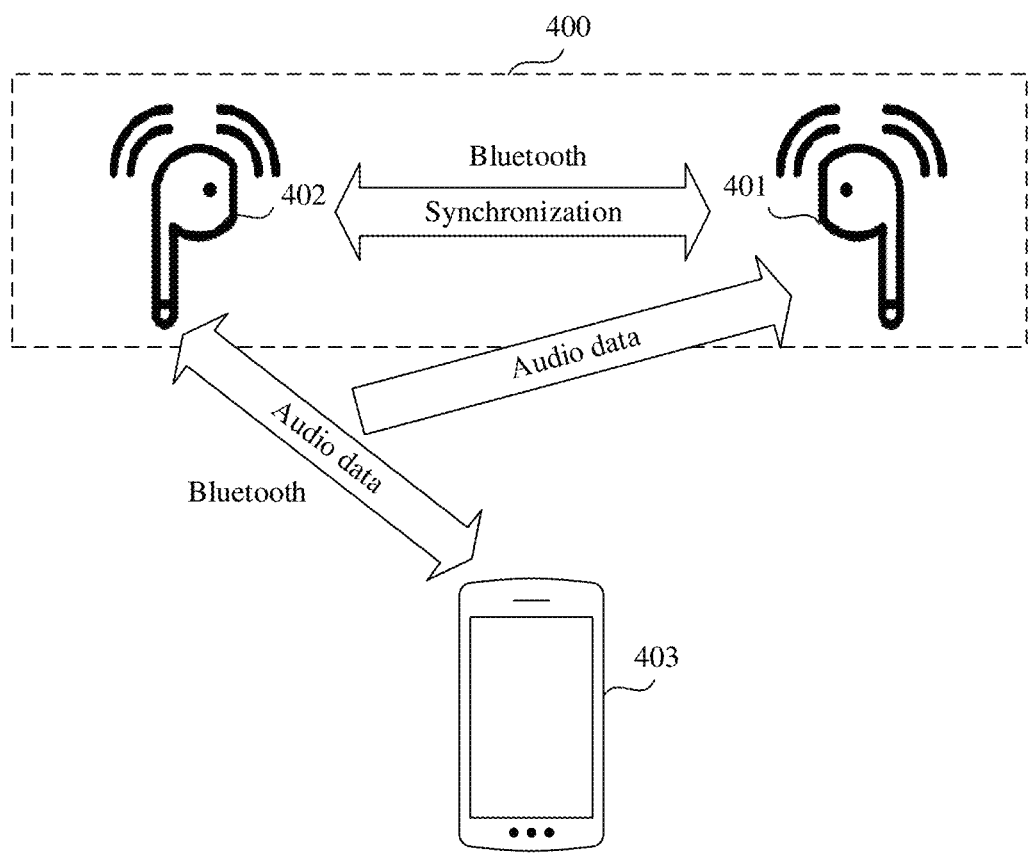
FIG. 4A is a schematic diagram of a connection mode according to an embodiment of this application.

Referring to FIG. 4A, in a listening solution, a TWS headset 400 may include a primary earbud 402 and a secondary earbud 401, and a mobile phone 403 establishes a Bluetooth connection to the primary earbud 402, to complete audio data exchange with the primary earbud 402 and complete service actions (for example, playing, pause, switching to a previous song, and switching to a next song) triggered by the mobile phone 403 and the TWS headset 400. A Bluetooth connection is established between the two earbuds, to complete information synchronization between the two earbuds. The secondary earbud 401 obtains audio data by listening on a Bluetooth link between the primary earbud 402 and the mobile phone 403.

Figure 4B:
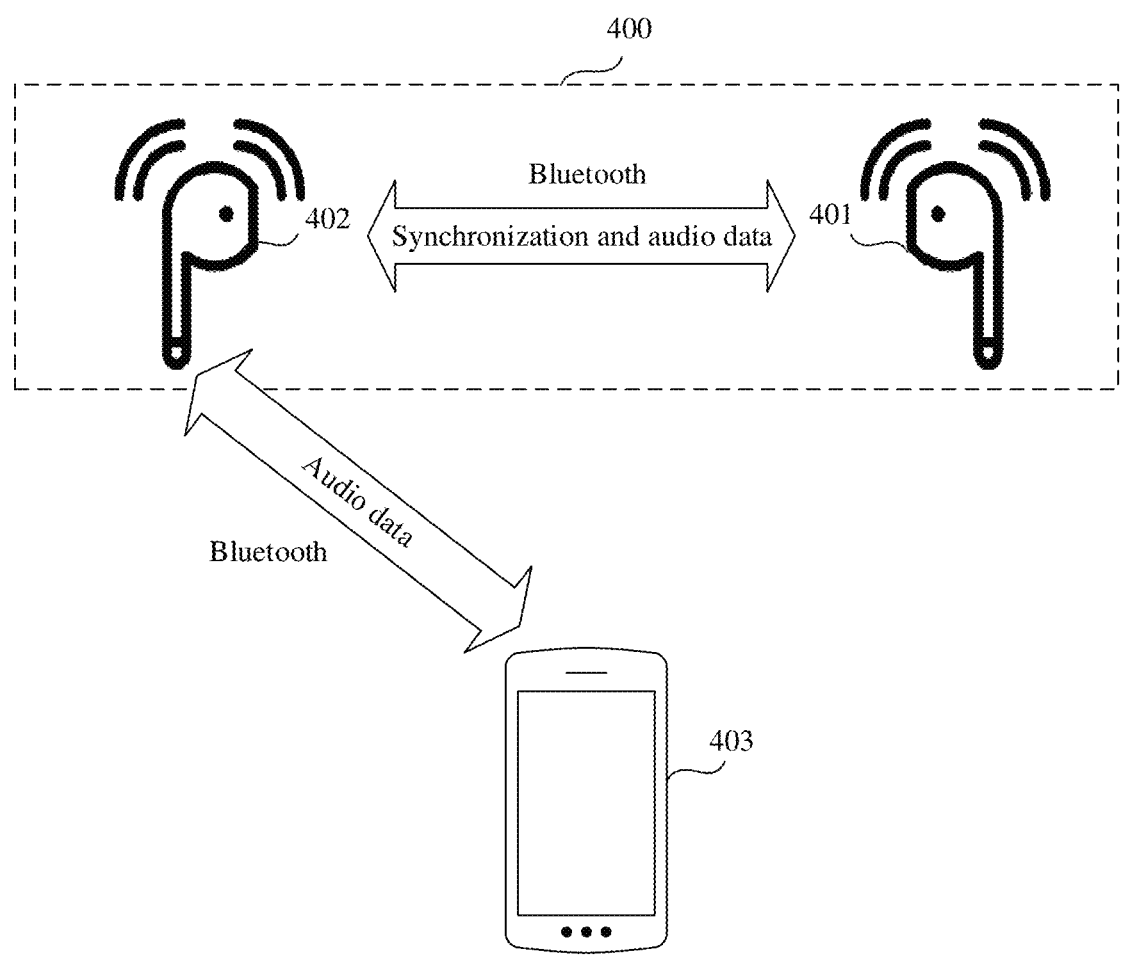
FIG. 4B is a schematic diagram of another connection mode according to an embodiment of this application.

Referring to FIG. 4B, in a forwarding solution, a TWS headset 400 may include a primary earbud 402 and a secondary earbud 401, and a mobile phone 403 establishes a Bluetooth connection to the primary earbud 402, to complete audio data exchange with the primary earbud 402 and complete service actions triggered by the mobile phone 403 and the TWS headset 400. A Bluetooth connection is established between the two earbuds, to complete information synchronization between the two earbuds. The primary earbud 402 forwards audio data to the secondary earbud 401 by using a Bluetooth link between the primary earbud 402 and the secondary earbud 401.

Figure 4C:
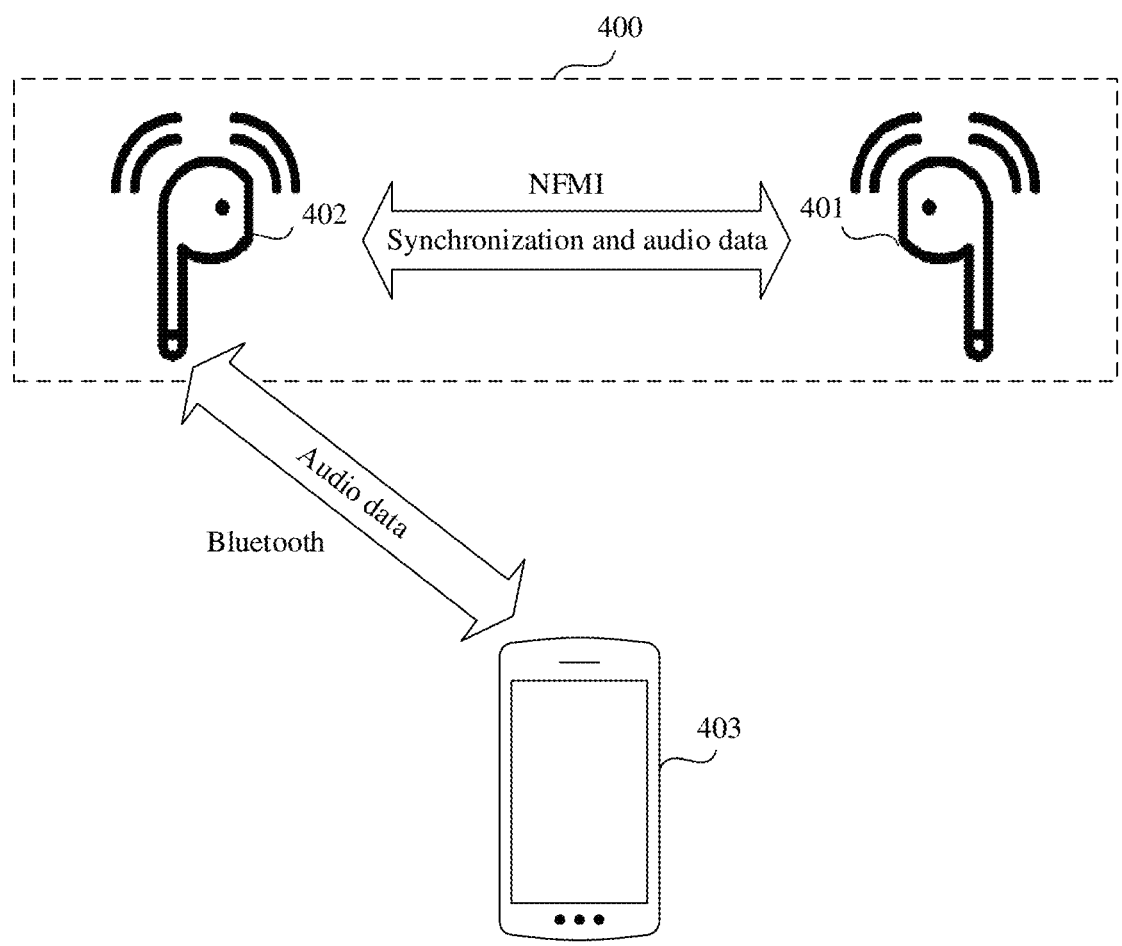
FIG. 4C is a schematic diagram of another connection mode according to an embodiment of this application.

Referring to FIG. 4C, in an NFMI solution, a TWS headset 400 may include a primary earbud 402 and a secondary earbud 401, and a mobile phone 403 establishes a Bluetooth connection to the primary earbud 402, to complete audio data exchange with the primary earbud 402 and complete service actions triggered by the mobile phone 403 and the TWS headset 400. An NFMI connection is established between the two earbuds, to complete information synchronization between the two earbuds. The primary earbud 402 forwards audio data to the secondary earbud 401 by using an NFMI link between the primary earbud 402 and the secondary earbud 401.

In the foregoing listening solution, forwarding solution, and NFMI solution, only a pairing connection between the mobile phone and one TWS earbud is established, and the mobile phone exchanges the audio data with the TWS headset only by using the connection to the earbud. Therefore, these connection solutions may also be referred to as single-feed solutions.

Figure 4D:
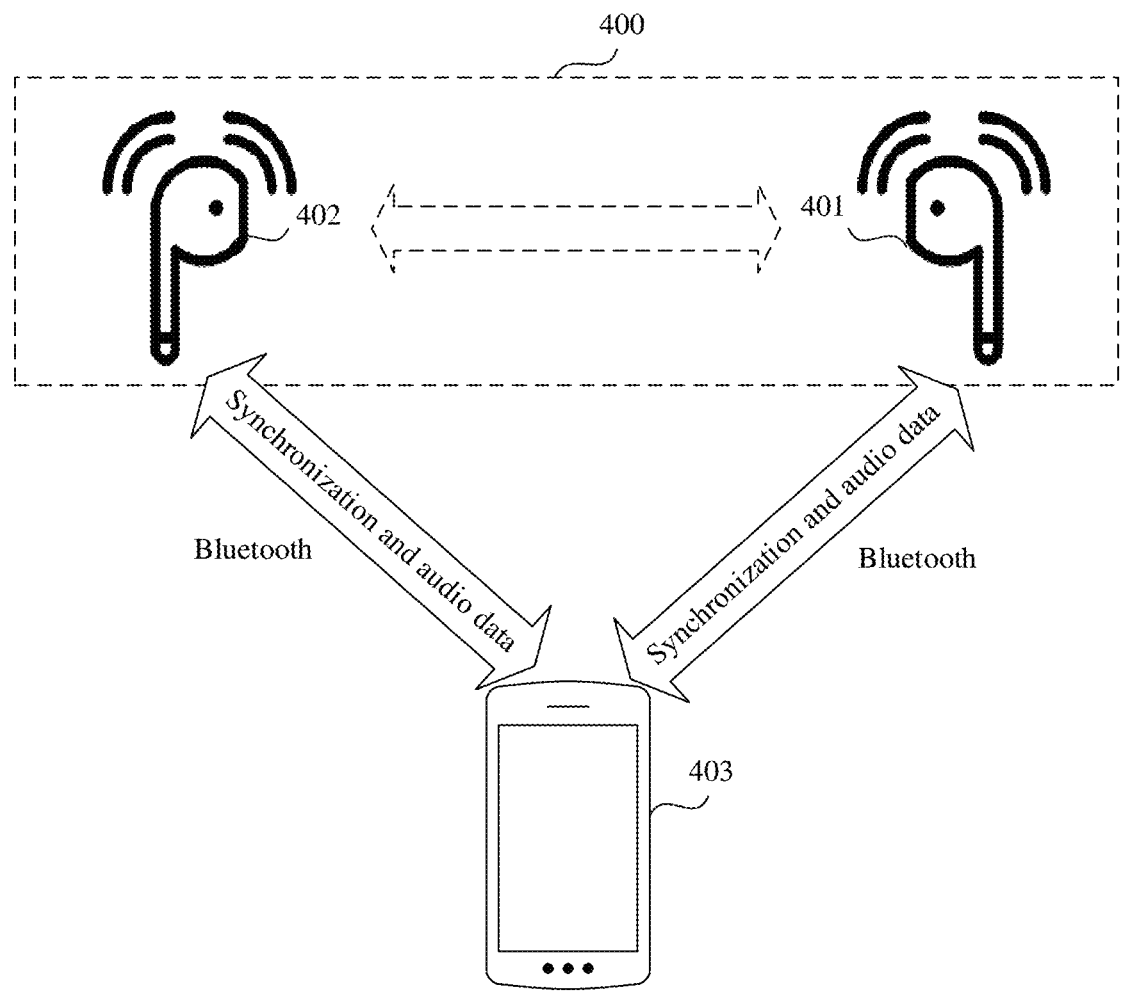
FIG. 4D is a schematic diagram of another connection mode according to an embodiment of this application.

In the pairing connection method provided in this embodiment of this application, referring to FIG. 4D, the mobile phone may establish a Bluetooth connection to each of the TWS earbuds that are used in pairs, and simultaneously maintain the two Bluetooth connections. In this way, the mobile phone exchanges audio data, service control data, synchronous data, and the like with each TWS earbud, to implement operations such as audio data playing and service action control. Therefore, this may be referred to as a dual connection solution or a dual-feed connection solution. After the dual-feed connection is established between the mobile phone and the TWS headset, the wireless connection between the two TWS earbuds may be maintained, or the wireless connection may be removed. The two TWS earbuds can receive same audio data, and each earbud plays left channel audio data or right channel audio data in the audio data based on whether the earbud is the left earbud or the right earbud. Alternatively, the mobile phone may send left channel audio data to the left earbud, and send right channel audio data to the right earbud, so that the two earbuds play different channels of audio data.

For example, in an embodiment, the TWS headset includes a first earbud and a second earbud. During use of the TWS headset, the mobile phone may first establish a Bluetooth pairing connection to the first earbud, and then the mobile phone may establish a Bluetooth pairing connection to the second earbud. In this way, the mobile phone establishes the Bluetooth connection to each TWS earbud, thereby implementing a dual-feed connection.

After the dual-feed connection is established, the two TWS earbuds cooperate with each other to work together, to synchronously play a left channel signal and a right channel signal of same audio data. After the dual-feed connection is established, a link between the mobile phone and each TWS earbud may occupy a frequency band of 2.4 GHz, and the two earbuds do not need to share the frequency band of 2.4 GHz. Therefore, transmission bandwidth of the TWS headset is relatively high. In addition, each earbud can reply with a retransmission message, a confirmation message, and the like in time by using the link between the earbud and the mobile phone, and therefore can make a response as soon as possible with a small packet loss rate, strong interference immunity, and relatively desirable sound quality of the audio data. Moreover, a problem of a link (for example, poor channel quality or link disconnection) between the mobile phone and one TWS earbud does not affect the other TWS earbud, data transmission can still be normally performed between the mobile phone and the other TWS earbud, without causing interruption of data transmission. Furthermore, in the dual-feed connection solution, the two earbuds of the TWS headset can directly receive data sent by the mobile phone, without a need to perform forwarding like other solutions.

In addition, a wireless connection may further be established between the first earbud and the second earbud of the TWS. In this case, after the mobile phone establishes the Bluetooth pairing connection to the first earbud, the mobile phone and the second earbud may exchange information such as a Bluetooth address of the mobile phone or the second earbud by using the first earbud as a media device, and the mobile phone and the second earbud may establish the Bluetooth pairing connection based on the Bluetooth addresses obtained through interaction, thereby implementing the dual-feed connection. The Bluetooth address is used to uniquely identify a Bluetooth device. For example, the Bluetooth address may be a MAC address or a sequence number. In the following embodiments of this application, an example is used for description in which the Bluetooth address is a MAC address.

The dual-feed connection may specifically be implemented in a plurality of manners.

For example, in one case, when the user uses the TWS headset, the two TWS earbuds may first perform a pairing connection, and then the mobile phone may establish a pairing connection to the first earbud of the TWS headset. Subsequently, the mobile phone and the second earbud may exchange a MAC address of the mobile phone or the second earbud by using the first earbud, and the mobile phone and the second earbud may establish a pairing connection based on the MAC addresses obtained through interaction.

In another case, when the user uses the TWS headset, the mobile phone may first establish a pairing connection to the first earbud of the TWS headset, and then the two TWS earbuds may perform a pairing connection. Subsequently, the mobile phone and the second earbud may exchange a MAC address of the mobile phone or the second earbud by using the first earbud, and the mobile phone and the second earbud establish a pairing connection based on the MAC addresses obtained through interaction.

In still another case, the mobile phone and the first earbud of the TWS headset establish a pairing connection, and exchange audio data. The first earbud is in monaural mode. After the first earbud is switched to a binaural mode, the first earbud and the second earbud perform a pairing connection. Then, the mobile phone and the second earbud may exchange a MAC address of the mobile phone or the second earbud by using the first earbud, and subsequently the mobile phone and the second earbud may establish a pairing connection based on the MAC addresses obtained through interaction. Alternatively, after the first earbud is switched to a binaural mode, the Bluetooth connection between the first earbud and the mobile phone is removed, and then a dual-feed connection is re-established between the mobile phone and the TWS headset.

Figure 5:
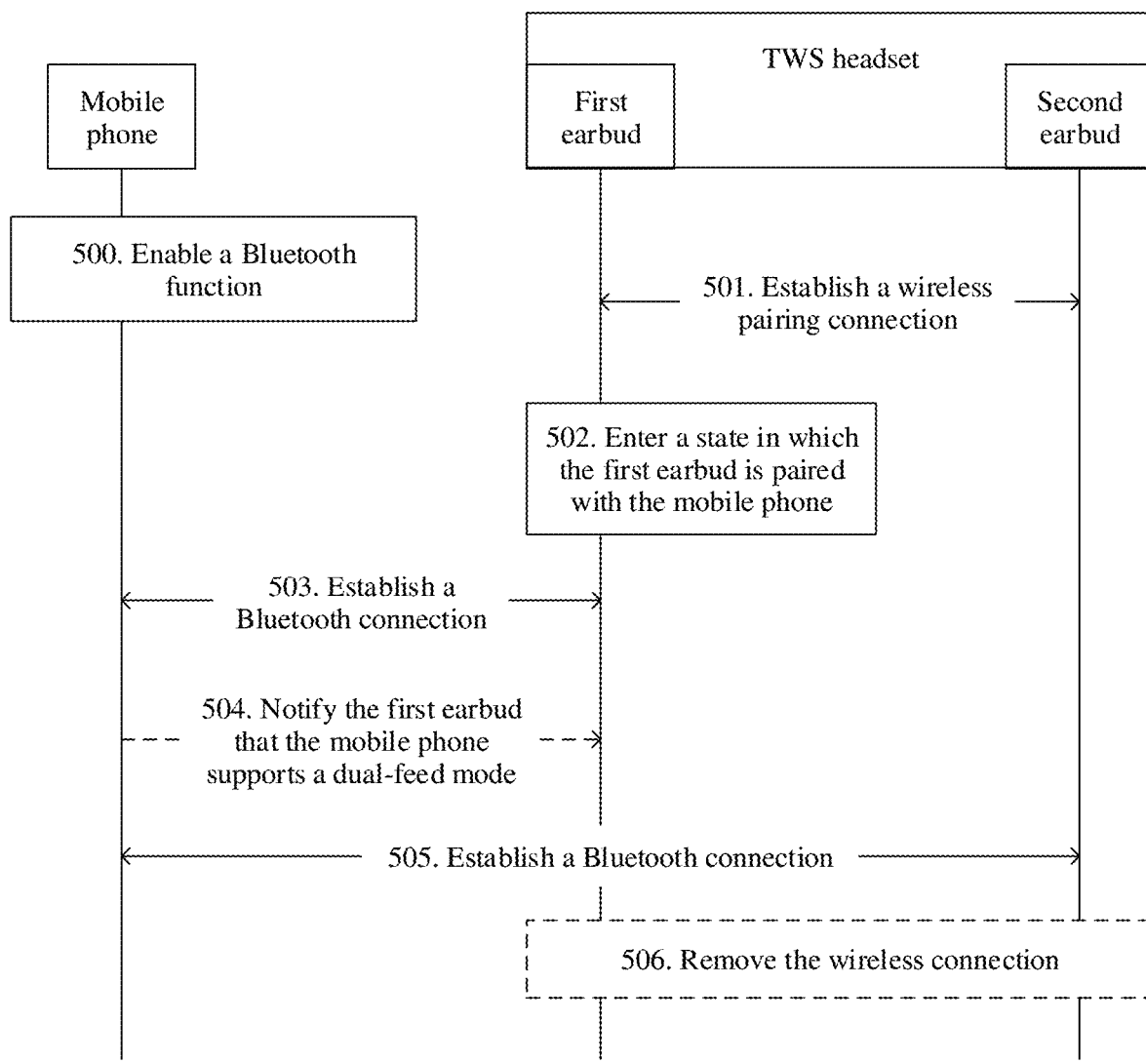
FIG. 5 is a flowchart of a Bluetooth connection method according to an embodiment of this application.

In the following embodiments of this application, an example is used for description in which a dual-feed connection is established between a mobile phone and a TWS headset in a music playing scenario, to play music for a user. Referring to FIG. 5, a dual-feed connection method may include the following steps.

500. Enable a Bluetooth function of the mobile phone.

Figure 6:
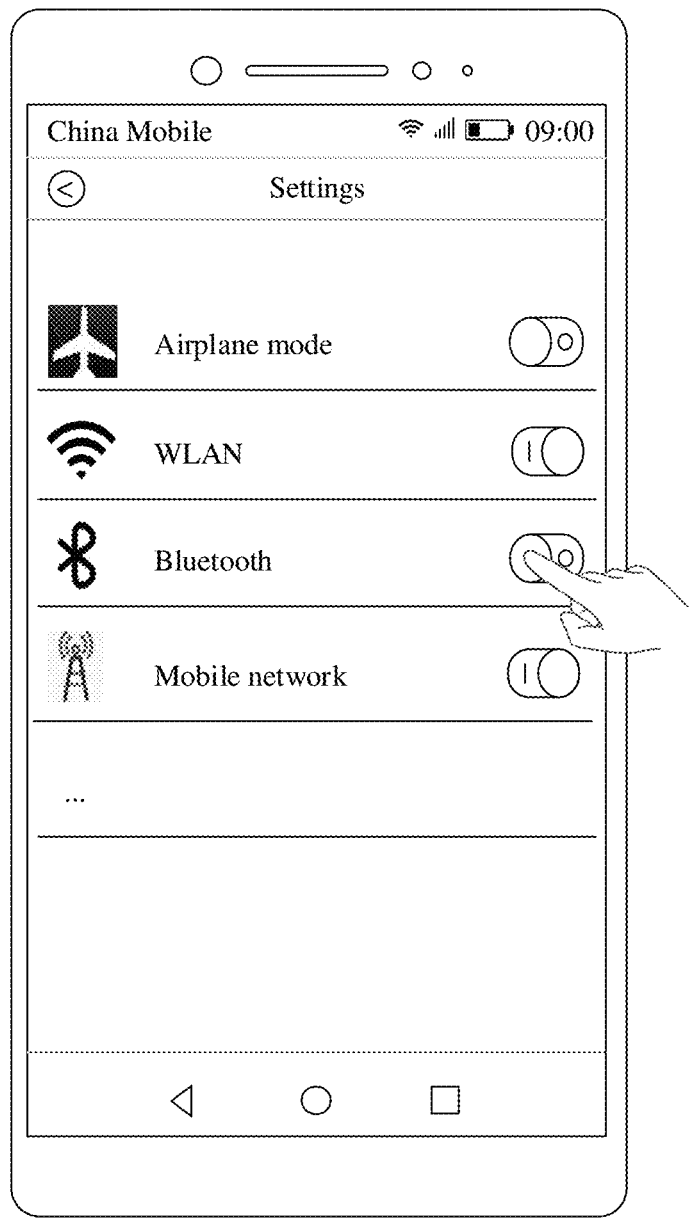
FIG. 6 is a schematic diagram of an interface according to an embodiment of this application.

When a user wants to use the TWS headset to play music, for example, referring to FIG. 6, the user may enable the Bluetooth function of the mobile phone.

501. A first earbud and a second earbud of the TWS headset establish a wireless pairing connection.

For example, in one case, the first earbud and the second earbud are placed in a headset box. When a box cover of the headset box is opened, or after one earbud is taken out from the headset box, or after the user touches (for example, light-touches, clicks, or touches and holds) a first control on the headset box, the first earbud and the second earbud may establish a Bluetooth pairing connection in a BLE manner or a BR/EDR manner. When the BLE manner is used, the two earbuds may discover each other through BLE broadcasting, and establish the Bluetooth pairing connection by using a BLE connectable broadcast message. When the BR/EDR manner is used, the two earbuds may discover each other in a page scan (page scan) or inquiry scan (inquiry scan) manner, and establish the Bluetooth pairing connection by using a page (page) message, a page response (page response) message, and the like. For specific processes in which the two manners are used to perform the Bluetooth pairing connections, reference may be made to the prior art. Details are not described herein.

In another case, if the first earbud and the second earbud have been paired with each other in advance before delivery or have been paired with each other before being used this time, the first earbud and the second earbud each have stored a MAC address of the other party. When a box cover of the headset box in which the first earbud and the second earbud are placed is opened, or after the user touches a first control on the headset box, or after one earbud is taken out from the headset box, the first earbud and the second earbud each may perform paging based on the stored MAC address of the other party, so as to establish a Bluetooth connection.

If the first earbud and the second earbud have been paired with each other, after the first earbud and the second earbud are placed in the headset box, a first indicator light on the headset box is on. If the first indicator light is off, it indicates that the first earbud and the second earbud have not been paired with each other. In this case, the user may touch a second control on the headset box, to indicate the first earbud and the second earbud to clear the stored MAC addresses. Then, the first earbud and the second earbud may establish a Bluetooth connection through scanning or the like.

In still another case, if the first earbud and the second earbud each have stored a MAC address of the other party, it indicates that the first earbud and the second earbud have been paired with each other. After the first earbud and the second earbud are placed in the headset box, the first earbud and the second earbud may clear the stored MAC addresses, to cancel a pairing relationship between the two earbuds. Then, when a box cover of the headset box is opened, or after the user touches (for example, light-touches, clicks, or touches and holds) a first control on the headset box, or after one earbud is taken out from the headset box, the first earbud and the second earbud may perform a Bluetooth pairing connection through scanning, broadcasting, or the like.

Because wireless communications technologies such as Bluetooth and Wi-Fi all use a frequency band of 2.4 GHz, if the first earbud and the second earbud that have established the Bluetooth pairing connection support NFMI, the first earbud and the second earbud may switch to an NFMI connection (which does not use the frequency band of 2.4 GHz), to reduce interference during data transmission performed in the frequency band of 2.4 GHz.

In addition, the first earbud and the second earbud may alternatively establish a wireless pairing connection through Wi-Fi or near field communication. This is not limited in this embodiment of this application.

It should be noted that after the first earbud and the second earbud establish the wireless connection, the first earbud and the second earbud each may store the MAC address of the other party, to indicate that the first earbud and the second earbud are used in pairs as a group/pair of devices. Alternatively, the first earbud and the second earbud may be corresponding to a same identity, to indicate that the first earbud and the second earbud are used in cooperation as a pair of devices. For example, the first earbud and the second earbud may synchronously play a left channel signal and a right channel signal of same audio data. The identity may be an identifier (for example, the MAC address of the first earbud) negotiated between the first earbud and the second earbud, may be an identifier set by the mobile phone after the first earbud and the second earbud are connected to the mobile phone, or may be a preset identifier. This is not limited in this embodiment of this application.

After the first earbud and the second earbud establish the wireless pairing connection, the first earbud and/or the second earbud may notify, in a sound form, the user that the connection has been established for the TWS headset. Alternatively, the first earbud and/or the second earbud notifies, by keeping the indicator light steady on, blinking, or in a specific color, the user that the connection has been established for the TWS headset. Alternatively, the first earbud and/or the second earbud notifies, by displaying information such as a text or an icon on a display screen, the user that the connection has been established for the TWS headset. Alternatively, the first earbud and/or the second earbud notifies, in a vibration manner or the like, the user that the connection has been established for the TWS headset.

After the first earbud and the second earbud establish the wireless pairing connection, the first earbud may enter a connectable discoverable state, so that the first earbud can be discovered by the mobile phone and connected to the mobile phone. The second earbud may enter a non-connectable undiscoverable state. The second earbud in the non-connectable undiscoverable state cannot be detected by another device through Bluetooth detection, and cannot establish a Bluetooth connection to another device.

502. The first earbud enters a state in which the first earbud is paired with the mobile phone.

Before the TWS headset and the mobile phone establish a Bluetooth pairing connection, the first earbud needs to first enter the state in which the first earbud is paired with the mobile phone. The first earbud may be any earbud of the TWS headset.

In an embodiment, the TWS headset may include a primary earbud and a secondary earbud, the first earbud may be the primary earbud of the TWS headset, and the second earbud may be the secondary earbud of the TWS headset. The mobile phone may first establish a Bluetooth connection to the primary earbud.

There may be a plurality of manners for distinguishing between the primary earbud and the secondary earbud. For example, it is considered by default that a right earbud of the TWS headset is the primary earbud, and a left earbud of the TWS headset is the secondary earbud. For another example, an earbud that is taken out from the headset box first is the primary earbud, and an earbud that is taken out from the headset box subsequently is the secondary earbud. For another example, an earbud that is placed in an ear first is the primary earbud, and an earbud that is placed in an ear subsequently is the secondary earbud. For another example, an earbud with a relatively large quantity of electricity in the TWS headset is the primary earbud, and the other earbud is the secondary earbud. For another example, the primary earbud is an earbud indicated by the user in a voice form or the like. After detecting a touch operation performed by the user on the second control on the first earbud, the first earbud may determine that the first earbud is the primary earbud. For another example, a primary earbud when the TWS headset is used this time is considered by default as a primary earbud when the user uses the TWS headset last time.

It should be noted that in a process in which the user uses the TWS headset, roles of the primary and secondary earbuds may be switched between each other.

When the user performs a pairing connection between the TWS headset and the current mobile phone, if the user has established a pairing relationship between the TWS headset and another electronic device and the pairing relationship between the TWS headset and the another electronic device has not been canceled, (for example, the TWS headset has stored a history of pairing between the TWS headset and the another mobile phone, such as a MAC address of the paired another mobile phone), the TWS headset can enter a paired state after canceling the pairing relationship with the another electronic device. For example, after detecting an operation performed by the user on touching and holding a pairing key (which may be, for example, a touch control 024) on the TWS headset, the TWS headset may cancel the pairing relationship between the TWS headset and the another electronic device. For another example, before the TWS headset is taken out from the headset box, the user may touch and hold a pairing key on the headset box, and the headset box may trigger the TWS headset to cancel the pairing relationship between the TWS headset and the another electronic device. After canceling the pairing relationship between the TWS headset and the another electronic device, the first earbud and the second earbud enter a pairable state.

If the user has not paired the TWS headset with another electronic device before (for example, the TWS headset has not stored a history of pairing between the TWS headset and the another electronic device), the TWS headset may automatically enter a paired state.

503. The mobile phone and the first earbud establish the Bluetooth connection.

After the first earbud enters the state in which the first earbud is paired with the mobile phone, the first earbud and the mobile phone may confirm, by using one or more interaction processes, whether the other party supports a dual-feed mode, and exchange a Bluetooth address (for example, a MAC address) of the other party. The mobile phone may establish the Bluetooth connection to the first earbud based on a capability of the mobile phone. For example, if both the mobile phone and the first earbud support a dual-feed mode, the following steps in this embodiment of this application may be performed, so as to establish the dual-feed connection between the mobile phone and the TWS headset. If the mobile phone does not support a dual-feed mode, a connection procedure of a listening, forwarding, or NFMI solution, or the like may be performed.

In a process of establishing the dual-feed connection between the mobile phone and the TWS headset, the first earbud and the mobile phone each may first confirm that the other party supports the dual-feed mode, and then they establish the Bluetooth connection; or the first earbud and the mobile phone may first establish the Bluetooth connection, and then each of them confirms that the other party supports the dual-feed mode.

Figure 7:
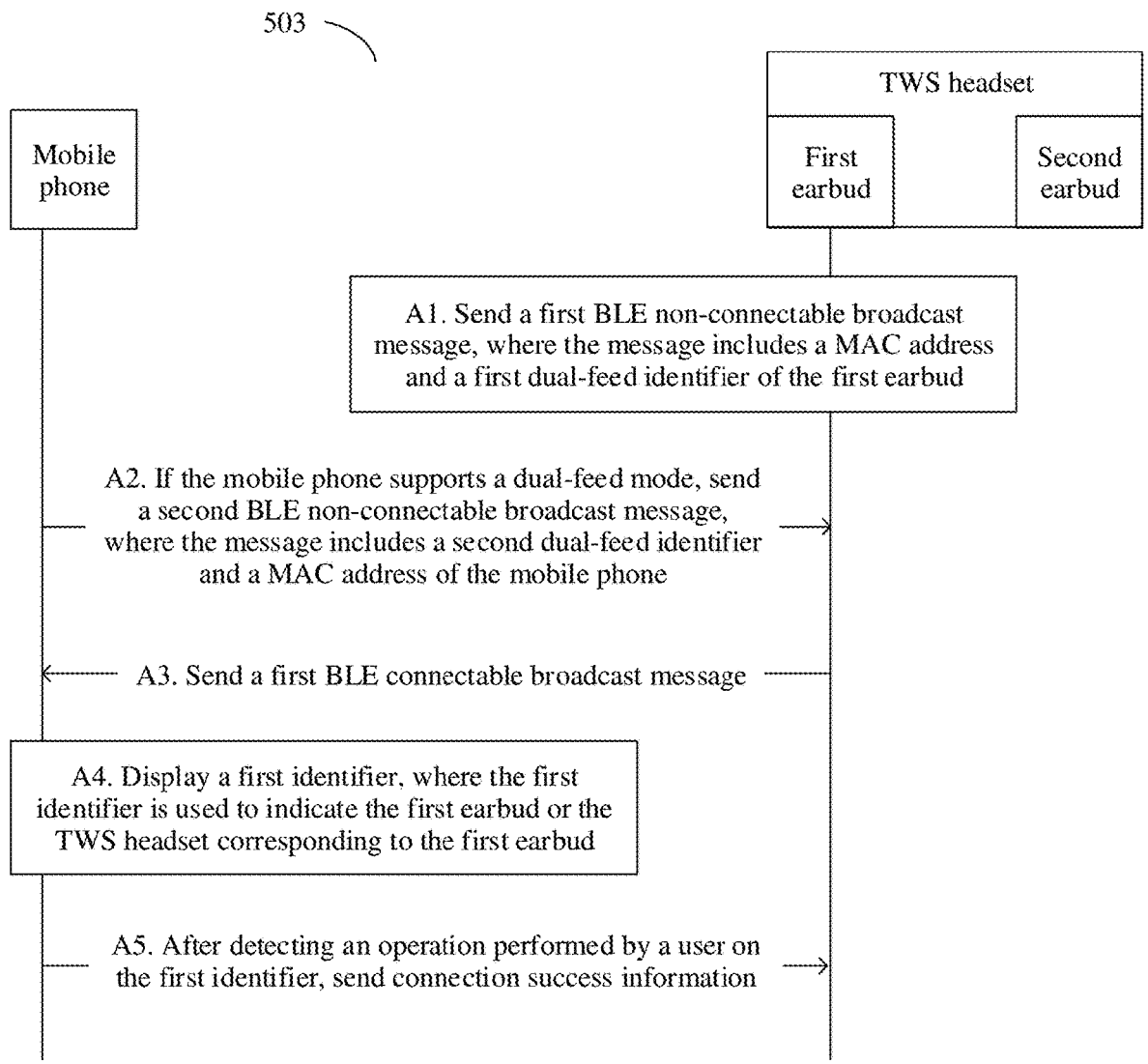
FIG. 7 is a flowchart of a Bluetooth connection method according to an embodiment of this application.

For example, in an embodiment, referring to FIG. 7, step 503 may specifically include the following steps.

A1. The first earbud sends a first BLE non-connectable broadcast message, where the first BLE non-connectable broadcast message includes the MAC address and a first dual-feed identifier (that is, first identification information) of the first earbud, and the first dual-feed identifier is used to indicate that the first earbud supports the dual-feed mode. In other words, the first earbud and the second earbud may establish the dual-feed connection to the mobile phone, and the mobile phone may simultaneously maintain two Bluetooth connections to the two earbuds.

After the first earbud and the second earbud establish the pairing connection, the first earbud can send a pairing broadcast message such as a BLE non-connectable broadcast message, so that the first earbud is discovered by the mobile phone as soon as possible, thereby improving efficiency of performing the pairing connection with the mobile phone.

In an implementation solution, the first earbud may discover the mobile phone or may be discovered by the mobile phone by using a quick discovery solution. In the quick discovery solution, a specific frequency band (for example, a frequency band 1) may be negotiated between a TWS headset of a specific manufacturer and a mobile phone of the specific manufacturer, and the two parties send and detect a pairing broadcast message in the specific frequency band, to improve discovery efficiency, thereby improving pairing connection efficiency.

For example, the first BLE non-connectable broadcast message may be an ADV_NONCONN_IND message. For example, the dual-feed identifier may be a universally unique identifier (universally unique identifier, UUID).

It should be noted that the first earbud may send the first BLE non-connectable broadcast message many times, so that the message can be detected by the mobile phone more quickly and with a higher probability.

In addition, the first BLE non-connectable broadcast message may further carry other information, for example, a name of the first earbud (for example, a left earbud whose name is a TWS headset or that carries "TWS"), a name of the TWS headset corresponding to the first earbud, and a device type of the first earbud (for example, the device type is the TWS headset).

A2. After the mobile phone receives the first BLE non-connectable broadcast message, if the mobile phone supports the dual-feed mode, the mobile phone sends a second BLE non-connectable broadcast message to the first earbud, where the second BLE non-connectable broadcast message includes a second dual-feed identifier (that is, second identification information) and the MAC address of the mobile phone, and the second dual-feed identifier is used to indicate that the mobile phone supports the dual-feed mode. In other words, the mobile phone supports establishment of the Bluetooth connections to both the earbuds of the headset, and may simultaneously maintain the two Bluetooth connections.

For example, the second BLE non-connectable broadcast message may be an ADV_NONCONN_IND message. After determining, based on the first dual-feed identifier of the first earbud, that the first earbud supports the dual-feed mode and determining that the mobile phone also supports the dual-feed mode, the mobile phone may send the second BLE non-connectable broadcast message to the first earbud, and carry the MAC address of the mobile phone and the MAC address of the first earbud, to notify the MAC address of the mobile phone to the first earbud. The second BLE non-connectable broadcast message may further include other information, for example, the MAC address of the first earbud.

In this way, the first earbud and the mobile phone implement exchange of the MAC addresses.

A3. After receiving the second BLE non-connectable broadcast message sent by the mobile phone, the first earbud sends a first BLE connectable broadcast message to the mobile phone.

After the first earbud determines, based on the first dual-feed identifier sent by the mobile phone, that the mobile phone also supports the dual-feed mode, and the first earbud and the mobile phone exchange the MAC addresses, the first earbud may send the first BLE connectable broadcast message to the mobile phone, to request to establish a connection to the mobile phone. For example, the first BLE connectable broadcast message may be an ADV_DIRECT_IND message or an ADV_IND message.

A4. If the mobile phone supports the dual-feed mode, the mobile phone displays a first identifier, where the first identifier is used to indicate the first earbud or the TWS headset corresponding to the first earbud.

For example, the first identifier may include at least one of the following: the name of the first earbud, an icon of the first earbud, the MAC address of the first earbud, the name of the TWS headset corresponding to the first earbud, an icon of the TWS headset corresponding to the first earbud, and the same identity corresponding to the first earbud and the second earbud. For example, referring to 800 in FIG. 8A, the first identifier may be an icon and a name of a TWS headset. For another example, when the quick discovery solution is used, referring to FIG. 8B, a mobile phone may display a first identifier by using a pop-up window 801, to notify the user that a Bluetooth device corresponding to the first identifier has been discovered. The first identifier includes an icon 802 of a TWS headset, a name 803 of the TWS headset, and a MAC address 804 of the TWS headset.

In an implementation solution, the first BLE non-connectable broadcast message or the first BLE connectable broadcast message may include the name of the TWS headset corresponding to the first earbud. If the mobile phone supports the dual-feed mode, the mobile phone may display the first identifier based on the name of the TWS headset received from the first earbud, where the first identifier includes the name of the TWS headset corresponding to the first earbud.

In an alternative to step A4, the mobile phone may display the first identifier regardless of whether the mobile phone supports the dual-feed mode. If the mobile phone supports the dual-feed mode, when the user performs an operation on the first identifier, the mobile phone may perform a dual-feed connection procedure in response to the user operation. If the mobile phone does not support the dual-feed mode, when the user performs an operation on the first identifier, the mobile phone makes no response to the user operation. For example, the first identifier is displayed in gray on the mobile phone, to notify the user that there is no response after tapping. For another example, the first identifier is marked as unusable.

A5. After detecting the operation performed by the user on the first identifier, the mobile phone sends connection success information to the first earbud.

After detecting the operation performed by the user on the first identifier, the mobile phone determines that the user wants to connect the mobile phone to the first earbud, and therefore the mobile phone may send the connection success information to the first earbud.

Figure 8A:
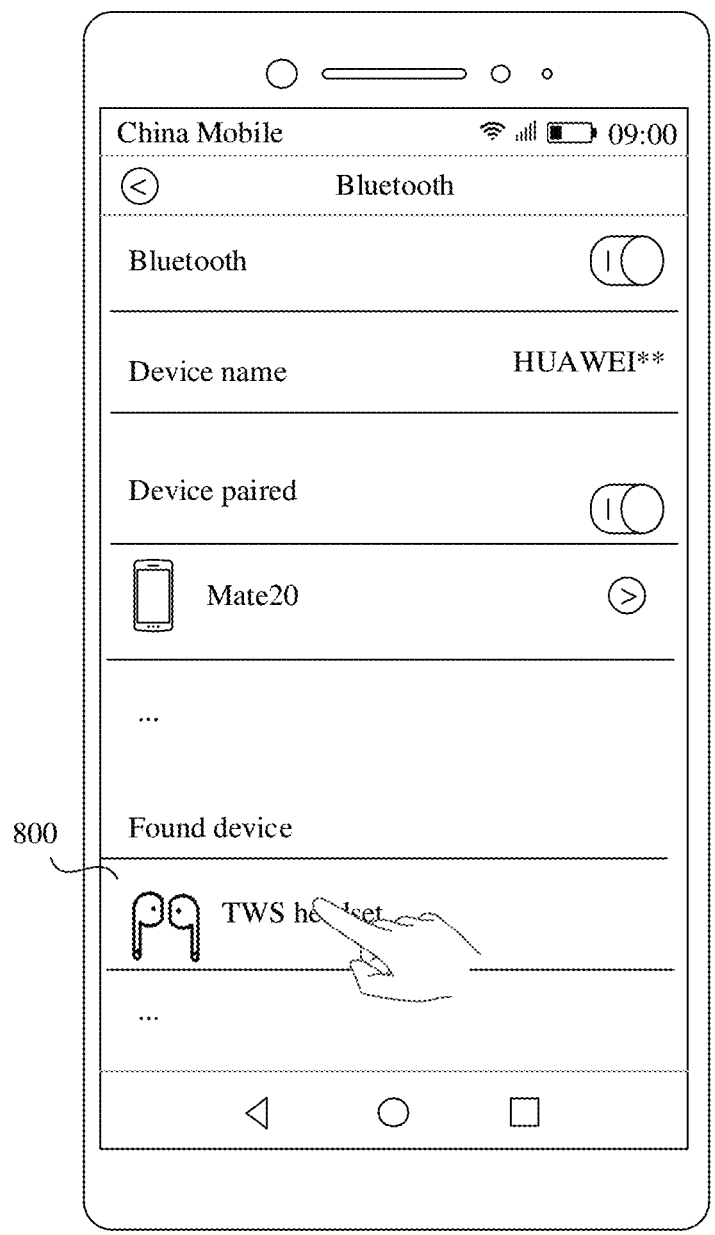
FIG. 8A is a schematic diagram of another interface according to an embodiment of this application.
Figure 8B:
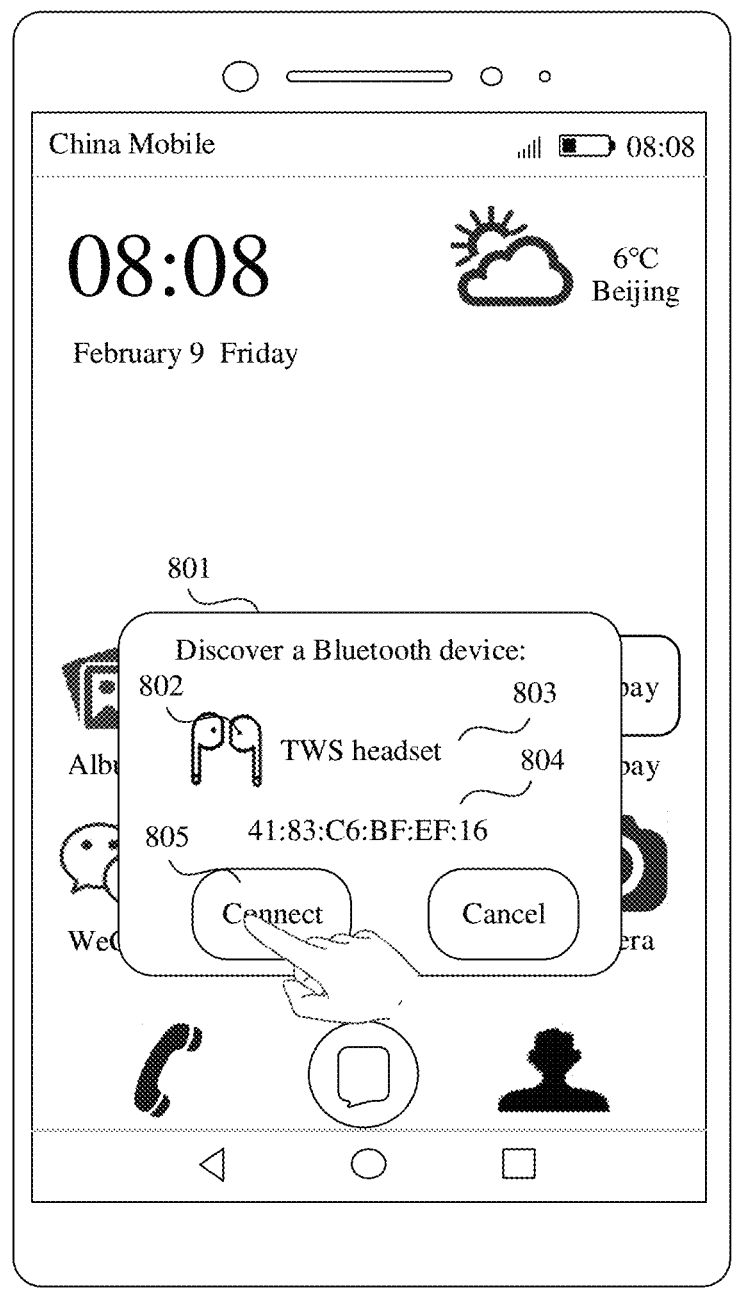
FIG. 8B is a schematic diagram of another interface according to an embodiment of this application.

For example, referring to FIG. 8A, the operation performed by the user on the first identifier may be an operation performed by the user for tapping the name of the TWS headset. For another example, referring to FIG. 8B, the operation performed by the user on the first identifier may be an operation performed by the user for tapping a connection control 805. The connection success information may be a CONNECT_IND message. After the mobile phone sends the connection success information to the first earbud, the mobile phone and the first earbud successfully establish the pairing connection.

Optionally, after receiving the first BLE connectable broadcast message sent by the first earbud, the mobile phone may perform authentication (for example, validity authentication), encryption, and other operations. After the authentication is completed, the mobile phone sends the connection success message to the first earbud.

In other words, in this embodiment of this application, the mobile phone and the first earbud may first determine, by using the first BLE non-connectable broadcast message, whether the other party supports the dual-feed mode. Then, after the user taps the first identifier, if both the mobile phone and the first earbud support the dual-feed mode, the mobile phone performs the dual-feed connection procedure. In addition, if the mobile phone or the first earbud does not support the dual-feed mode, the mobile phone performs the connection procedure of the forwarding, listening, or NFMI solution. Details are not described herein.

Figure 9:
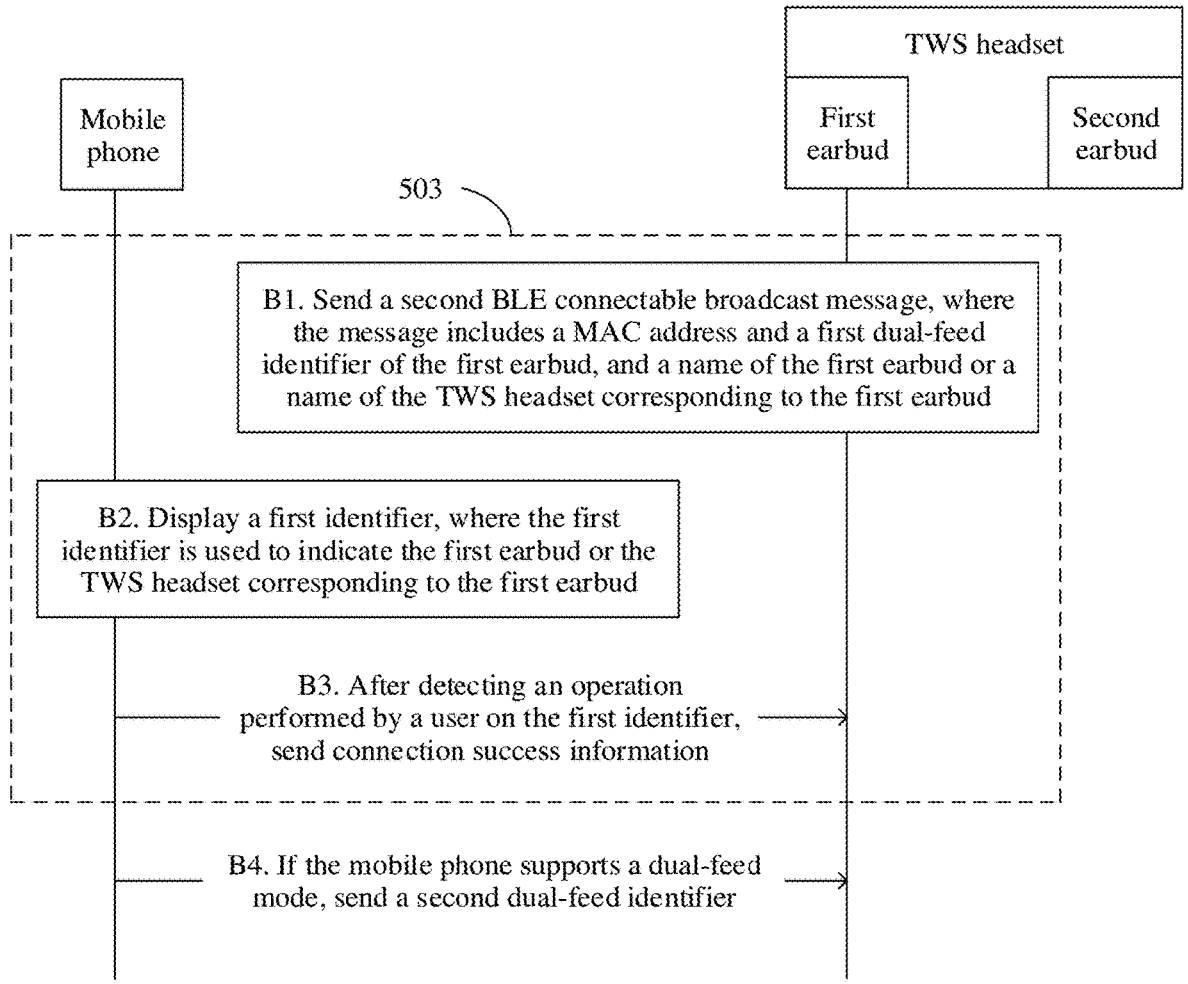
FIG. 9 is a flowchart of another Bluetooth connection method according to an embodiment of this application.

In another embodiment, referring to FIG. 9, step 503 may specifically include the following steps.

B1. The first earbud sends a second BLE connectable broadcast message, where the second BLE connectable broadcast message includes the MAC address and a first dual-feed identifier of the first earbud, and a name of the first earbud or a name of the TWS headset corresponding to the first earbud, and the first dual-feed identifier is used to indicate that the first earbud supports the dual-feed mode.

After the first earbud and the second earbud establish the pairing connection, the first earbud can send the second BLE connectable broadcast message, so that the first earbud is discovered by the mobile phone as soon as possible, thereby improving efficiency of performing the pairing connection with the mobile phone. For example, the second connectable broadcast message may be an ADV_IND message.

In addition, the second BLE connectable broadcast message may further include information such as the MAC address of the first earbud and a device type of the first earbud.

B2. After the mobile phone receives the second BLE connectable broadcast message sent by the first earbud, if the mobile phone supports the dual-feed mode, the mobile phone displays a first identifier, where the first identifier is used to indicate the first earbud or the TWS headset corresponding to the first earbud.

If the mobile phone supports the dual-feed mode, the mobile phone may display the first identifier based on the information carried in the second BLE connectable broadcast message. The first identifier may include the name of the first earbud or the name of the TWS headset corresponding to the first earbud.

B3. After detecting an operation performed by the user on the first identifier, the mobile phone sends connection success information to the first earbud.

The connection success information may include the MAC address of the mobile phone, so that the mobile phone can notify the Bluetooth address of the mobile phone to the first earbud.

After the user taps the first identifier, the mobile phone may send the connection success information to the first earbud, to establish the dual-feed connection between the mobile phone and the TWS headset. For example, the connection success information may be a CONNECT_IND message. In addition, if the mobile phone or the first earbud does not support the dual-feed mode, the connection procedure of the forwarding, listening, or NFMI solution is performed.

If the mobile phone supports the dual-feed mode, in an implementation solution, the connection success information in step B3 may include a second dual-feed identifier, where the second dual-feed identifier is used to indicate that the mobile phone supports the dual-feed mode. In another implementation solution, referring to FIG. 9, after B3 of step 503, step B4 is further included: The mobile phone may send a second dual-feed identifier to the first earbud through a connection link (for example, a BLE link) between the mobile phone and the first earbud. In another implementation solution, before step B3, after receiving a first BLE connectable broadcast message, the mobile phone may send a second dual-feed identifier to the first earbud, to notify the first earbud that the mobile phone also supports the dual-feed mode. Then, after detecting the operation performed by the user on the first identifier, the mobile phone sends the connection success information to the first earbud.

Figure 10A:
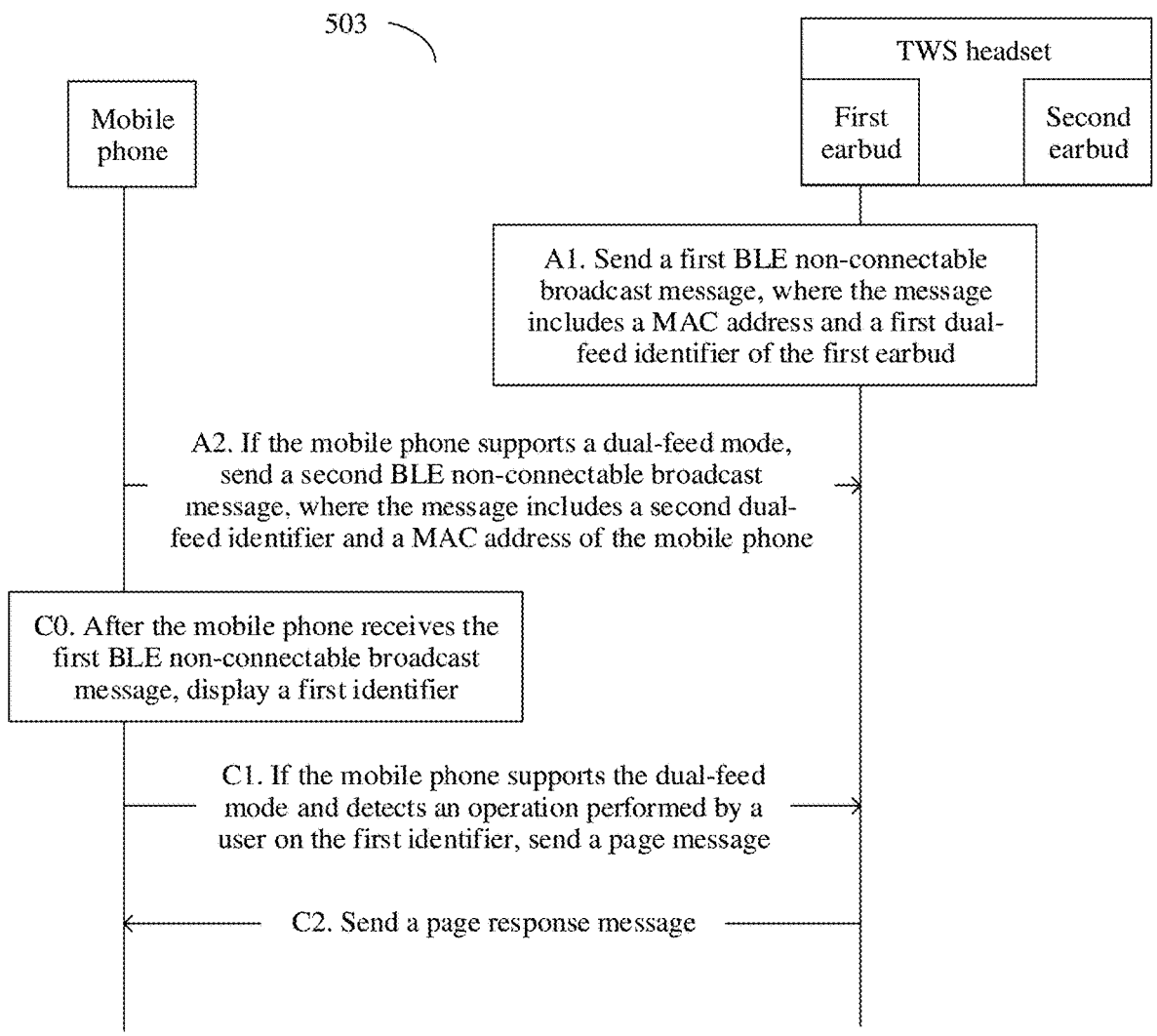
FIG. 10A is a flowchart of another Bluetooth connection method according to an embodiment of this application.

In other solutions, after detecting the operation performed by the user on the first identifier, the mobile phone may establish a Bluetooth connection to the first earbud by using a BR/EDR message. This is different from the foregoing solution in which the mobile phone establishes the Bluetooth connection to the first earbud by using the BLE message. For example, in the solution described in A1-A5, referring to FIG. 10A, steps A3-A5 may be replaced with the following steps.

C0. After the mobile phone receives the first BLE non-connectable broadcast message, if the mobile phone supports the dual-feed mode, the mobile phone displays a first identifier, where the first identifier is used to indicate the first earbud or the TWS headset corresponding to the first earbud.

The first BLE non-connectable broadcast message includes the name of the first earbud or the name of the TWS headset corresponding to the first earbud, and the mobile phone may display the first identifier based on the first BLE non-connectable broadcast message.

C1. If detecting an operation performed by the user on the first identifier, the mobile phone sends a page message to the first earbud.

The first BLE non-connectable broadcast message in step A1 may carry the MAC address of the first earbud, and the mobile phone may send the page message to the first earbud based on the MAC address.

If the mobile phone supports the dual-feed mode, in an implementation solution, the mobile phone may add the second dual-feed identifier to the page message sent in step C1, where the second dual-feed identifier is used to indicate that the mobile phone supports the dual-feed mode. In another implementation solution, after step C1, the mobile phone may send the second dual-feed identifier through a connection link between the mobile phone and the first earbud. In another implementation solution, before step C1, after receiving the first BLE non-connectable broadcast message, the mobile phone may send, to the first earbud, information carrying the second dual-feed identifier, to notify the first earbud that the mobile phone also supports the dual-feed mode. Then, after detecting the operation performed by the user on the first identifier, the mobile phone sends the page message to the first earbud.

C2. The first earbud sends a page response message to the mobile phone.

The first earbud may send the page response message to the mobile phone, to establish the Bluetooth pairing connection between the first earbud and the mobile phone.

Figure 10B:
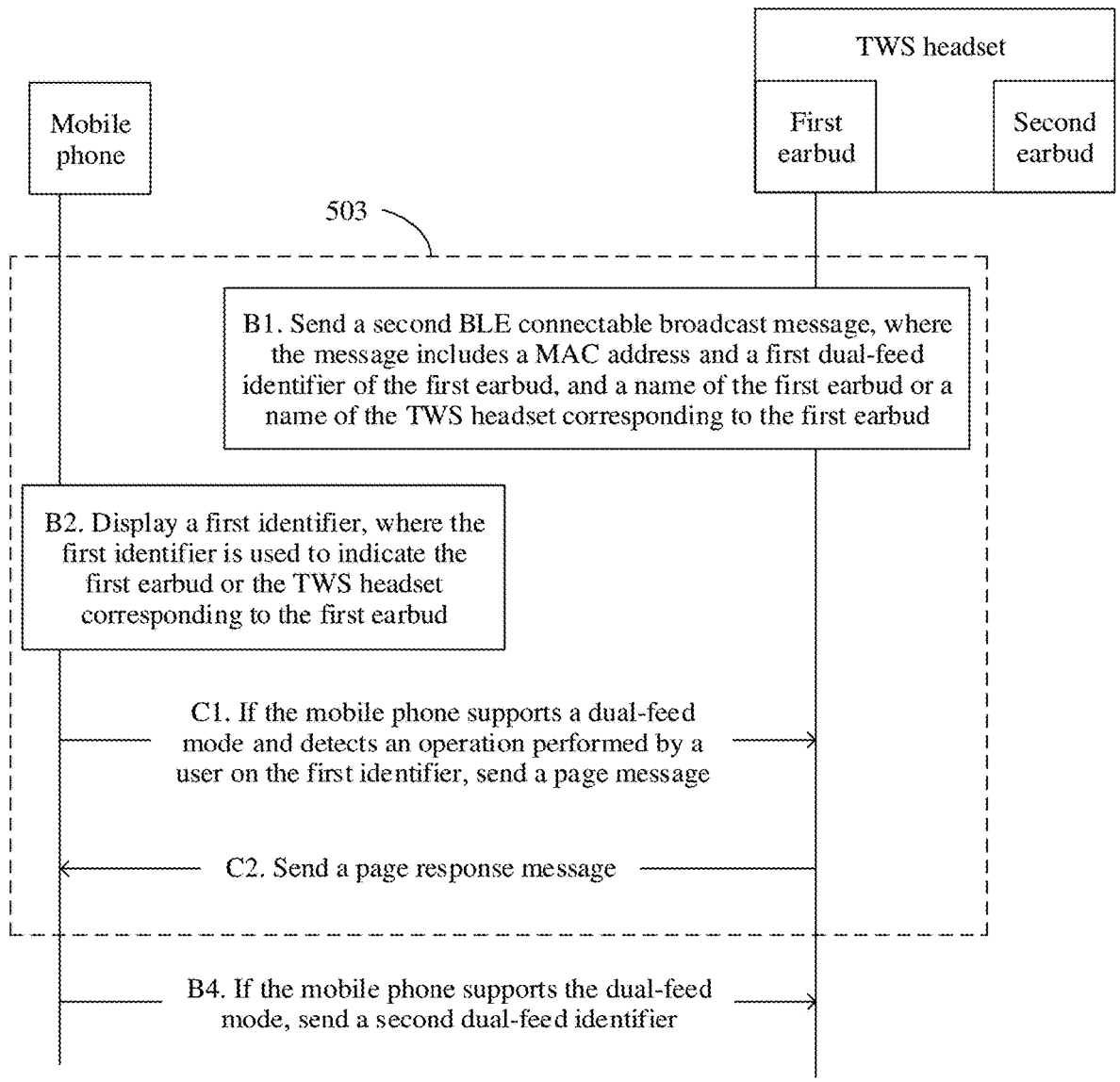
FIG. 10B is a flowchart of another Bluetooth connection method according to an embodiment of this application.

For another example, in the solution described in B1-B3, referring to FIG. 10B, step B3 may be replaced with steps C1-C2. The second BLE connectable broadcast message in step B1 may carry the MAC address of the first earbud, and the mobile phone may send the page message to the first earbud based on the MAC address. In an alternative to step C1, if the mobile phone supports the dual-feed mode, after receiving the second BLE connectable broadcast message, the mobile phone may send, to the first earbud, information carrying the second dual-feed identifier, to notify the first earbud that the mobile phone also supports the dual-feed mode. Then, after detecting an operation performed by the user on the first identifier, the mobile phone sends a page message to the first earbud.

The solution described in steps C1 and C2 can be used to support a mobile phone that can perform a BR/EDR Bluetooth pairing connection. A BR/EDR page message and page response message and the like conform to an SPP protocol, and a broadcast message in the BLE manner conforms to a GATT protocol.

It should be noted that in a process in which the mobile phone and the first earbud establish the Bluetooth pairing connection, the mobile phone and the first earbud may further negotiate with each other on link information such as a frequency hopping manner and clock information, so that music data can be transmitted by using the connection link between the mobile phone and the first earbud.

After the mobile phone and the first earbud establish the Bluetooth pairing connection, the two parties may store the MAC addresses of the other party.

Figure 11:
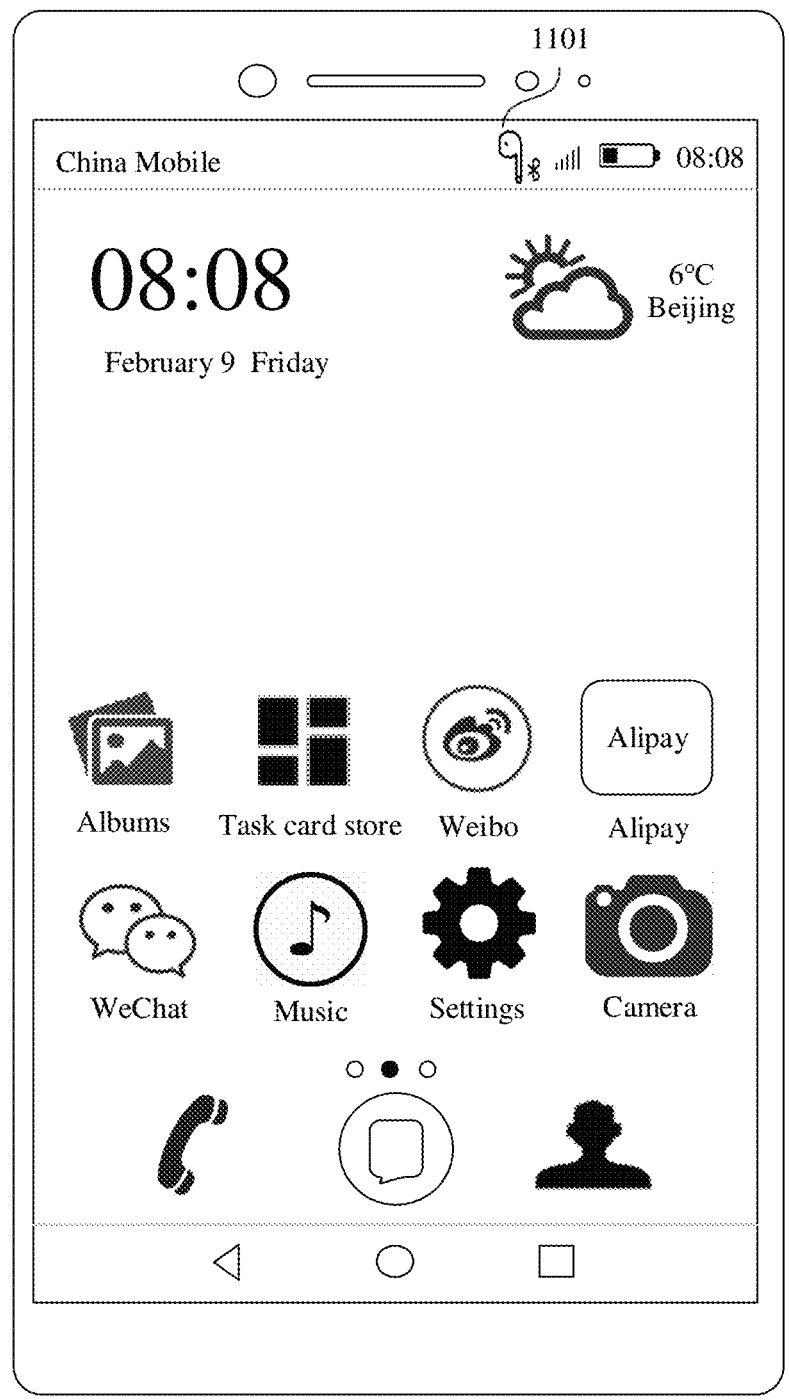
FIG. 11 is a schematic diagram of another interface according to an embodiment of this application.

After the mobile phone and the first earbud establish the Bluetooth pairing connection, the mobile phone and/or the TWS headset may notify, in a form such as a sound, display, vibration, or indicator light form, the user that the mobile phone and the first earbud have established the pairing connection. For example, referring to FIG. 11, the mobile phone may display an icon 1101 of the first earbud in a status bar, indicating that the mobile phone and the first earbud have established the Bluetooth pairing connection.

It should be noted that in this embodiment of this application, the first earbud may establish the wireless connection to the second earbud before establishing the Bluetooth connection to the mobile phone, or may establish the wireless connection to the second earbud after establishing the Bluetooth connection to the mobile phone. This is not limited in this embodiment of this application.

To be compatible with the Bluetooth BR/EDR manner, in the solution described in steps A1-A5 and in the solution described in steps A1-A2 and C0-C2, when the first earbud sends the first BLE non-connectable broadcast message in step A1, the first earbud may also enable the BR/EDR manner, and may perform discovery or may be discovered in the page scan or inquiry scan manner. Alternatively, in the solution described in steps B1-B3 and in the solution described in steps B1-B2 and C1-C2, when the first earbud sends the second BLE connectable broadcast message in step B1, the first earbud may also enable the BR/EDR manner, and may perform discovery or may be discovered in the page scan or inquiry scan manner.

After the mobile phone determines, in the BLE manner (for example, the manner in step A1 or B1), that the first earbud supports the dual-feed mode, or discovers the first earbud in the BR/EDR manner, in an implementation solution in step A4, B2, or C0, the mobile phone may display one first identifier. The first identifier may include the name of the first earbud or the name of the TWS headset corresponding to the first earbud.

For example, if the mobile phone determines, in the BLE manner, that the first earbud supports the dual-feed mode and does not discover the first earbud in the BR/EDR manner, the mobile phone may display the first identifier. Then, if the mobile phone discovers the first earbud in the BR/EDR manner, the mobile phone determines that devices discovered in the two manners are a same device, and therefore displays only one first identifier.

For another example, if the mobile phone determines, in the BLE manner, that the first earbud supports the dual-feed mode and does not discover the first earbud in the BR/EDR manner, the mobile phone may not display the first identifier temporarily. If the mobile phone determines that the mobile phone also supports the dual-feed mode, the mobile phone may display the first identifier. Then, if the mobile phone discovers the first earbud in the BR/EDR manner, the mobile phone determines that devices discovered in the two manners are a same device, and therefore displays only one first identifier.

For still another example, in step A4, B2, or C0, if the mobile phone discovers the first earbud in the BR/EDR manner, the mobile phone may display the first identifier. Then, if the mobile phone discovers the first earbud in the BLE manner and the first earbud supports the dual-feed mode, the mobile phone determines that devices discovered in the two manners are a same device, and therefore displays only one first identifier.

For yet another example, neither the first BLE non-connectable broadcast message sent by the first earbud in step A2 nor the second BLE connectable broadcast message sent by the first earbud in step B1 includes the name of the first earbud and the name of the TWS headset corresponding to the first earbud. In step A4, B2, or C0, if the mobile phone determines, in the BLE manner, that the first earbud supports the dual-feed mode and does not discover the first earbud in the BR/EDR manner, the mobile phone may not display the first identifier. Then, if the mobile phone discovers the first earbud in the BR/EDR manner, the mobile phone may display the first identifier.

After the user taps the first identifier, if the mobile phone supports the dual-feed mode, the dual-feed connection procedure is performed. If the mobile phone does not support the dual-feed mode, the connection procedure of the listening, forwarding, or NFMI solution, or the like is performed.

In another implementation solution of step A4, B2, or C0, the mobile phone may display one first identifier and one second identifier. The first identifier may include the name of the first earbud or the name of the TWS headset corresponding to the first earbud. The second identifier may include the MAC address of the first earbud or a MAC address of the TWS headset.

For example, in step A4, B2, or C0, if the mobile phone determines, based on the first BLE non-connectable broadcast message or the second BLE connectable broadcast message that does not carry the name of the earbud, that the first earbud supports the dual-feed mode and does not discover the first earbud in the BR/EDR manner, the mobile phone may display the second identifier based on the first BLE non-connectable broadcast message or the second BLE connectable broadcast message. If the mobile phone determines that the mobile phone also supports the dual-feed mode, the mobile phone may display the first identifier. Then, if the mobile phone discovers the first earbud in the BR/EDR manner, the mobile phone determines that devices discovered in the two manners are a same device, and therefore can still display the first identifier and continue to display the second identifier.

For another example, in step A4, B2, or C0, if the mobile phone determines, in the BLE manner, that the first earbud supports the dual-feed mode and does not discover the first earbud in the BR/EDR manner, the mobile phone may display the second identifier. If the mobile phone determines that the mobile phone also supports the dual-feed mode, the mobile phone still displays the second identifier. Then, if the mobile phone discovers the first earbud in the BR/EDR manner, the mobile phone may display the first identifier and stop displaying the second identifier, or the mobile phone may display the first identifier and the second identifier.

For still another example, in step A4, B2, or C0, if the mobile phone discovers the first earbud in the BR/EDR manner, the mobile phone may display the first identifier. Then, if determining, based on the BLE pairing broadcast message, that the first earbud and the mobile phone support the dual-feed mode, the mobile phone may display the first identifier and the second identifier.

When the mobile phone displays the first identifier and the second identifier, in one case, after the user taps the first identifier, if the mobile phone supports the dual-feed mode, the dual-feed connection procedure is performed. If the mobile phone does not support the dual-feed mode, the connection procedure of the listening, forwarding, or NFMI solution, or the like is performed. When the user taps the second identifier, the mobile phone does not perform the connection process. In another case, when the user taps the first identifier, the mobile phone performs the connection procedure of the listening, forwarding, or NFMI solution, or the like. When the user taps the second identifier, the mobile phone performs the dual-feed connection procedure provided in this embodiment of this application.

Figure 12:
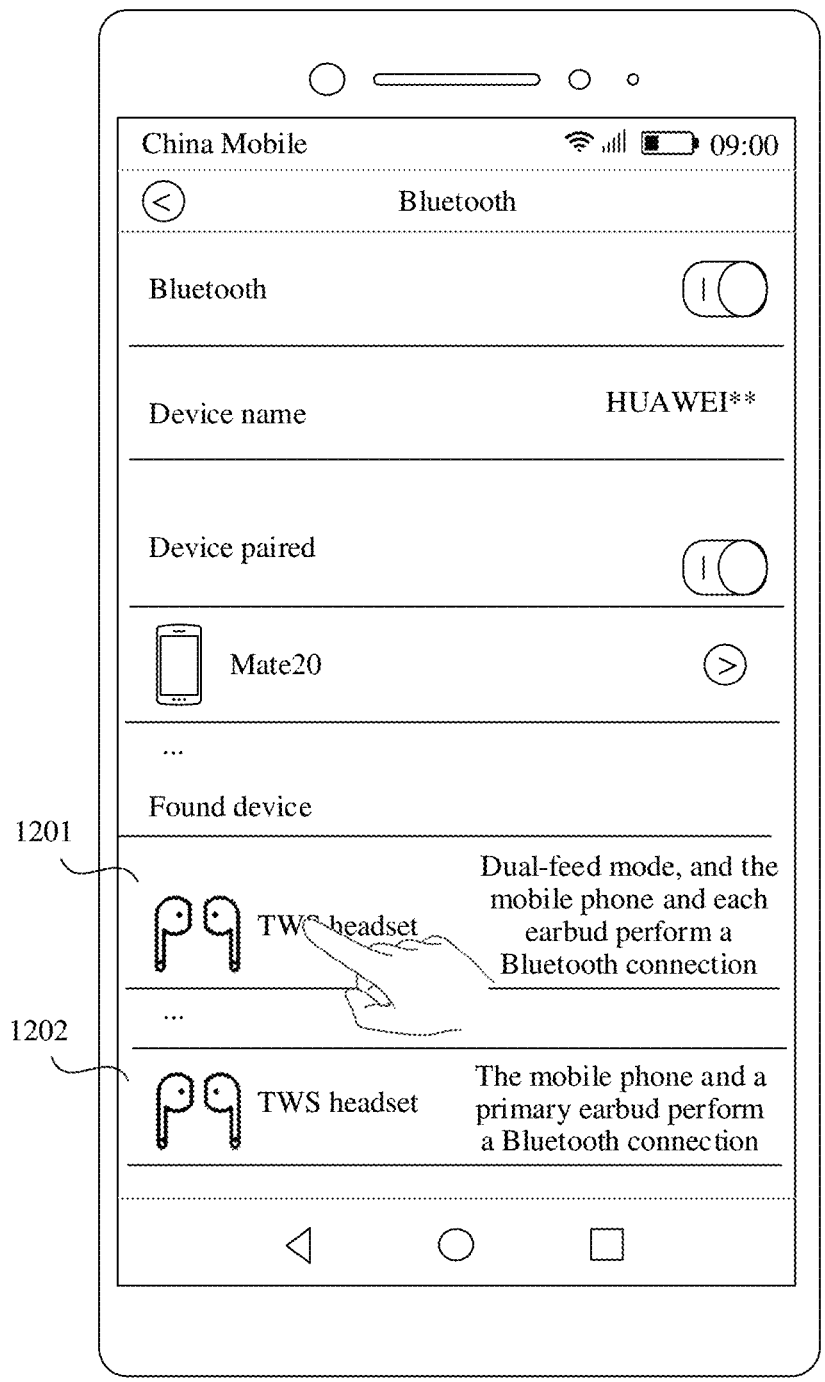
FIG. 12 is a schematic diagram of another interface according to an embodiment of this application.

In still another implementation solution of step A4, B2, or C0, after the mobile phone discovers the first earbud in the BLE manner and if the first earbud supports the dual-feed mode, the mobile phone may display one first identifier. After the mobile phone discovers the first earbud in the BR/EDR manner, the mobile phone may display one third identifier. Both the first identifier and the third identifier may include the name of the first earbud or the name of the TWS headset corresponding to the first earbud. The first identifier is corresponding to a dual-feed connection solution, and the third identifier is corresponding to a single-feed connection solution. For example, for a schematic diagram of an interface of the mobile phone, reference may be made to FIG. 12. 1201 indicates the first identifier and 1202 indicates the third identifier. After the mobile phone detects a tapping operation performed by the user on the first identifier 1201, if the mobile phone also supports the dual-feed mode, the mobile phone performs the dual-feed connection procedure provided in this embodiment of this application together with the first earbud and the second earbud. After the mobile phone detects a tapping operation performed by the user on the third identifier 1202, the mobile phone performs the connection procedure of the listening, forwarding, or NFMI solution together with the first earbud and the second earbud.

In addition, after the first earbud enters a BR/EDR connectable discoverable state, if the first earbud determines that both the first earbud and the mobile phone support the dual-feed mode (for example, the first earbud receives the second dual-feed identifier sent by the mobile phone), the first earbud may further disable the BR/EDR manner.

504. The mobile phone notifies the first earbud that the mobile phone supports the dual-feed mode.

If the mobile phone supports the dual-feed mode, the mobile phone may notify the first earbud, so that the first earbud can perform the dual-feed connection procedure. For example, this step may be step B4. It should be noted that if in step 503, the mobile phone has notified the first earbud that the mobile phone supports the dual-feed mode (for example, the mobile phone sends the second dual-feed identifier to the first earbud in step A2), step 504 may alternatively be omitted.

In an embodiment, after the mobile phone and the first earbud establish the Bluetooth pairing connection, the first earbud may forward the MAC address of the mobile phone to the second earbud. The second earbud establishes a Bluetooth pairing connection to the mobile phone based on the MAC address of the mobile phone, and the mobile phone maintains the Bluetooth connection to the first earbud. The following details this solution.

505. The mobile phone and the second earbud establish the Bluetooth connection.

After determining that the mobile phone also supports the dual-feed mode, the first earbud may perform the dual-feed connection procedure. The first earbud may send information about the second earbud (for example, the MAC address of the second earbud) to the mobile phone, and send information about the mobile phone (for example, the MAC address of the mobile phone) to the second earbud, so that the mobile phone and the second earbud can establish the Bluetooth connection by using the first earbud.

For example, in an implementation solution, step 505 may include: The first earbud may send connection information 1 to the second earbud, where the connection information 1 may include the MAC address of the mobile phone; and indicate the second earbud to enter a connectable discoverable state. Indicating the second earbud to enter the connectable discoverable state may be implemented by content in the connection information 1 other than the MAC address of the mobile phone, for example, a specific identifier; may be implemented by carrying a specific message or a message type of the connection information 1; or may be implemented by the MAC address of the mobile phone, for the reason that the second earbud has the Bluetooth address of the first earbud, and after receiving another MAC address sent by the first earbud, the second earbud can identify the another MAC address, and then enters the connectable discoverable state and is connected to the mobile phone. The second earbud may establish the Bluetooth connection to the mobile phone based on the connection information 1, and the mobile phone maintains the Bluetooth connection to the first earbud. After the second earbud establishes the Bluetooth connection to the mobile phone, because the first earbud and the mobile phone have established the Bluetooth connection, the dual-feed connection between the mobile phone and the two earbuds of the TWS headset is implemented.

After receiving the second dual-feed identifier sent by the mobile phone, the first earbud determines that the mobile phone also supports the dual-feed mode, and therefore the dual-feed connection procedure can be performed. In the dual-feed connection procedure, because the first earbud stores the MAC address of the mobile phone after the first earbud and the mobile phone establish the Bluetooth pairing connection, the first earbud may forward the MAC address of the mobile phone to the second earbud by using the connection information 1, so that the second earbud establishes the Bluetooth pairing connection to the mobile phone based on the MAC address of the mobile phone.

In addition, the connection information 1 may further include the link information such as the frequency hopping manner and the clock information negotiated between the mobile phone and the first earbud, so that the second earbud can establish a link based on the link information negotiated between the mobile phone and the first earbud, and keep the established link synchronous with the link between the mobile phone and the first earbud. In this way, the first earbud and the second earbud can play stereo music.

When there is a BR/EDR connection between the first earbud and the second earbud, the first earbud may send the connection information 1 to the second earbud according to the SPP protocol. When there is a BLE connection between the first earbud and the second earbud, the first earbud may send the connection information 1 to the second earbud according to the GATT protocol.

Figure 13:
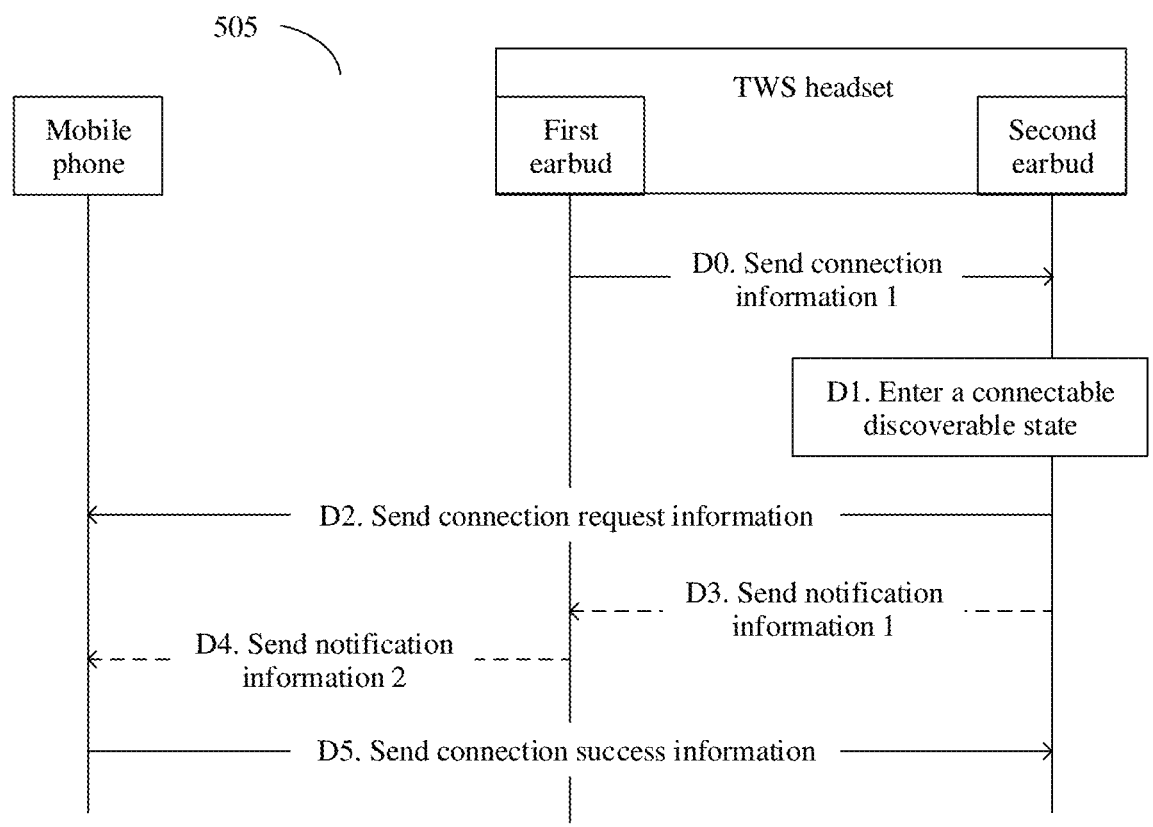
FIG. 13 is a flowchart of another Bluetooth connection method according to an embodiment of this application.

In an embodiment, in step 505, the second earbud may proactively be connected to the mobile phone. Referring to FIG. 13, step 505 may specifically include the following steps.

D0. The first earbud sends the connection information 1 to the second earbud, to notify the second earbud that the second earbud can be connected to the mobile phone.

D1. After receiving the connection information 1, the second earbud enters the connectable discoverable state, so that the second earbud can proactively be connected to another device or is connected to another device.

D2. The second earbud sends connection request information to the mobile phone based on the connection information 1.

Specifically, the second earbud may proactively initiate a connection to the mobile phone based on information such as the MAC address of the mobile phone in the connection information 1. The connection request information may include the MAC address of the second earbud, so that the party receiving the connection request information can learn an identity of the device that requests to establish the connection.

It should be noted that in step 505 in this specification, information (for example, connection information, notification information, or connection success information) exchanged between the mobile phone, the first earbud, and the second earbud may be a BLE message that conforms to the GATT protocol, or may be a BR/EDR message that conforms to the SPP protocol. This is not limited in this embodiment of this application.

For example, the connection request information may be a BLE ADV_DIRECT_IND message or ADV_IND message; or a connection request may be a BR/EDR page message.

D3. The second earbud sends notification information 1 to the first earbud.

The notification information 1 may be used to notify the first earbud that the second earbud requests to connect to the mobile phone or that the second earbud has entered the connectable discoverable state.

It should be noted that step D2 may be performed before step D3, or may be performed after step D3. This is not limited in this embodiment of this application.

D4. After receiving the notification information 1 sent by the second earbud, the first earbud sends notification information 2 to the mobile phone.

The notification information 2 may include the MAC address of the second earbud, which may indicate that the second earbud and the first earbud are used in pairs, so that the mobile phone learns an identity of the device that is paired with the first earbud and that requests to connect to the mobile phone. The notification information 2 may be used to notify the mobile phone that the second earbud requests to connect to the mobile phone or that the second earbud has entered the connectable discoverable state, and that the mobile phone can be connected to the second earbud.

It should be noted that step D2 may be performed before step D4, or may be performed after step D4. This is not limited in this embodiment of this application.

After receiving the MAC address of the second earbud in the notification information 2, the mobile phone may determine that the first earbud and the second earbud are used as a pair of devices.

D5. After receiving the notification information 2 and the connection request information, the mobile phone sends connection success information to the second earbud.

Specifically, after receiving the connection request information sent by the second earbud, if the mobile phone determines that the MAC address in the connection request information is consistent with the MAC address of the second earbud in the notification information 2 sent by the first earbud, it may indicate that the device that requests to establish the connection to the mobile phone is the device indicated by the first earbud, and therefore the mobile phone can send the connection success information to the second earbud. In this way, the mobile phone and the second earbud successfully establish the Bluetooth connection, thereby implementing the dual-feed connection between the mobile phone and the TWS headset.

For example, in correspondence to the connection request information, the connection success information may be a BLE CONNECT_IND message or a BR/EDR page response message.

In another embodiment, in an alternative to steps D2-D4, the second earbud may send the connection request information to the mobile phone through forwarding performed by the first earbud. For example, the connection request information in step D2 is forwarded by using the first earbud. Further, in a forwarding process, the second earbud may send the notification information 1 to the first earbud, and the first earbud sends notification information 2 to the mobile phone.

In another embodiment, the first earbud may alternatively notify the MAC address of the second earbud to the mobile phone in step 503, so that the mobile phone learns the pairing relationship between the first earbud and the second earbud. For example, the first earbud may send the MAC address of the second earbud to the mobile phone by using a BLE non-connectable broadcast message or a BLE connectable broadcast message, to indicate that the first earbud and the second earbud are used in pairs and notify the mobile phone that the mobile phone can be connected to the second earbud. In this way, in the solution described in D0-D5, steps D3 and D4 may alternatively be omitted. In addition, in step D5, after receiving the connection request information sent by the second earbud, if the mobile phone determines that the MAC address of the second earbud sent by the first earbud in step 503 is consistent with the MAC address in the connection request information, the mobile phone sends the connection success information to the second earbud. In this way, the mobile phone and the second earbud successfully establish the Bluetooth connection, thereby implementing the dual-feed connection between the mobile phone and the TWS headset.

Figure 14:
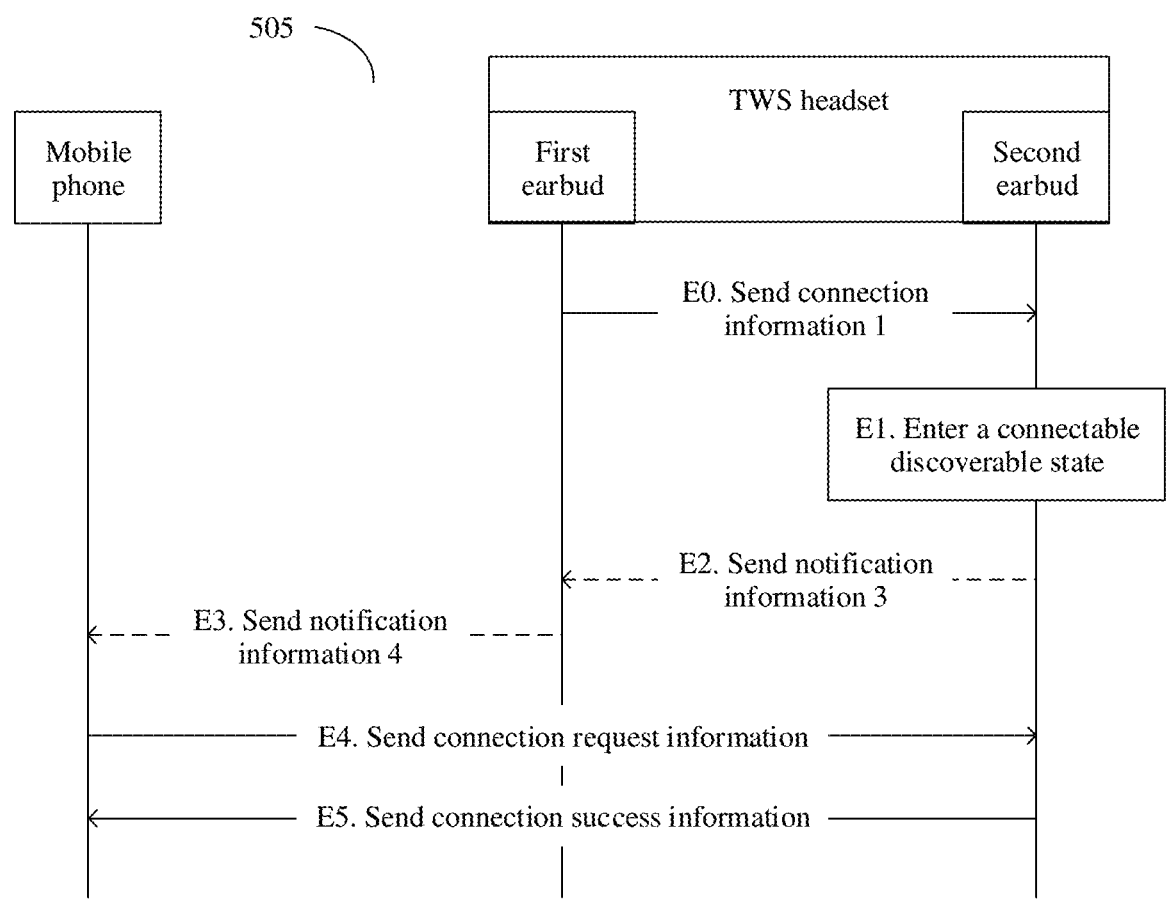
FIG. 14 is a flowchart of another Bluetooth connection method according to an embodiment of this application.

In another embodiment, in step 505, the mobile phone may proactively be connected to the second earbud. Referring to FIG. 14, step 505 may specifically include the following steps.

E0. The first earbud sends the connection information 1 to the second earbud, to notify the second earbud that the second earbud can be connected to the mobile phone.

E1. After receiving the connection information 1, the second earbud enters the connectable discoverable state, so that the second earbud can proactively be connected to another device or is connected to another device.

E2. The second earbud sends a notification information 3 to the first earbud.

The notification information 3 may be used to notify the first earbud that the second earbud has entered the connectable discoverable state or that the second earbud can be connected.

E3. After receiving the notification information 3 sent by the second earbud, the first earbud sends notification information 4 to the mobile phone.

The notification information 4 includes the MAC address of the second earbud, which may indicate that the second earbud and the first earbud are used in pairs. The notification information 4 may be used to indicate the mobile phone to be proactively connected to the second earbud, or notify the mobile phone that the second earbud has entered the connectable discoverable state. The first earbud may receive the MAC address of the second earbud from the notification information 3, or may obtain the MAC address of the second earbud when performing the wireless connection with the second earbud previously.

E4. After receiving the notification information 4, the mobile phone sends connection request information to the second earbud.

Specifically, the mobile phone may send the connection request information to the second earbud based on the MAC address of the second earbud in the notification information 4. The connection request information may include the MAC address of the mobile phone, so that the party receiving the connection request information can learn an identity of the device that requests to establish the connection.

E5. After receiving the connection request information, the second earbud sends connection success information to the mobile phone.

Specifically, after receiving the connection request information, if the second earbud determines that the MAC address of the mobile phone in the connection request information is consistent with the MAC address of the mobile phone in the connection information 1 sent by the first earbud, it may indicate that the device that requests to establish the connection to the second earbud is the device indicated by the first earbud, and therefore the second earbud can send the connection success information to the mobile phone.

In another embodiment, the first earbud may alternatively notify the MAC address of the second earbud to the mobile phone in step 503, so that the mobile phone learns the pairing relationship between the first earbud and the second earbud. For example, the first earbud may send the MAC address of the second earbud to the mobile phone by using the first BLE non-connectable broadcast message, the first connectable broadcast message, or the second connectable broadcast message, to indicate that the first earbud and the second earbud are used in pairs and notify the mobile phone that the mobile phone can be connected to the second earbud. In this way, in the solution described in steps E0-E5, steps E2 and E3 may alternatively be omitted. In step E4, the mobile phone may send the connection request information to the second earbud based on the MAC address of the second earbud that is sent by the first earbud in step 503.

Figure 15:
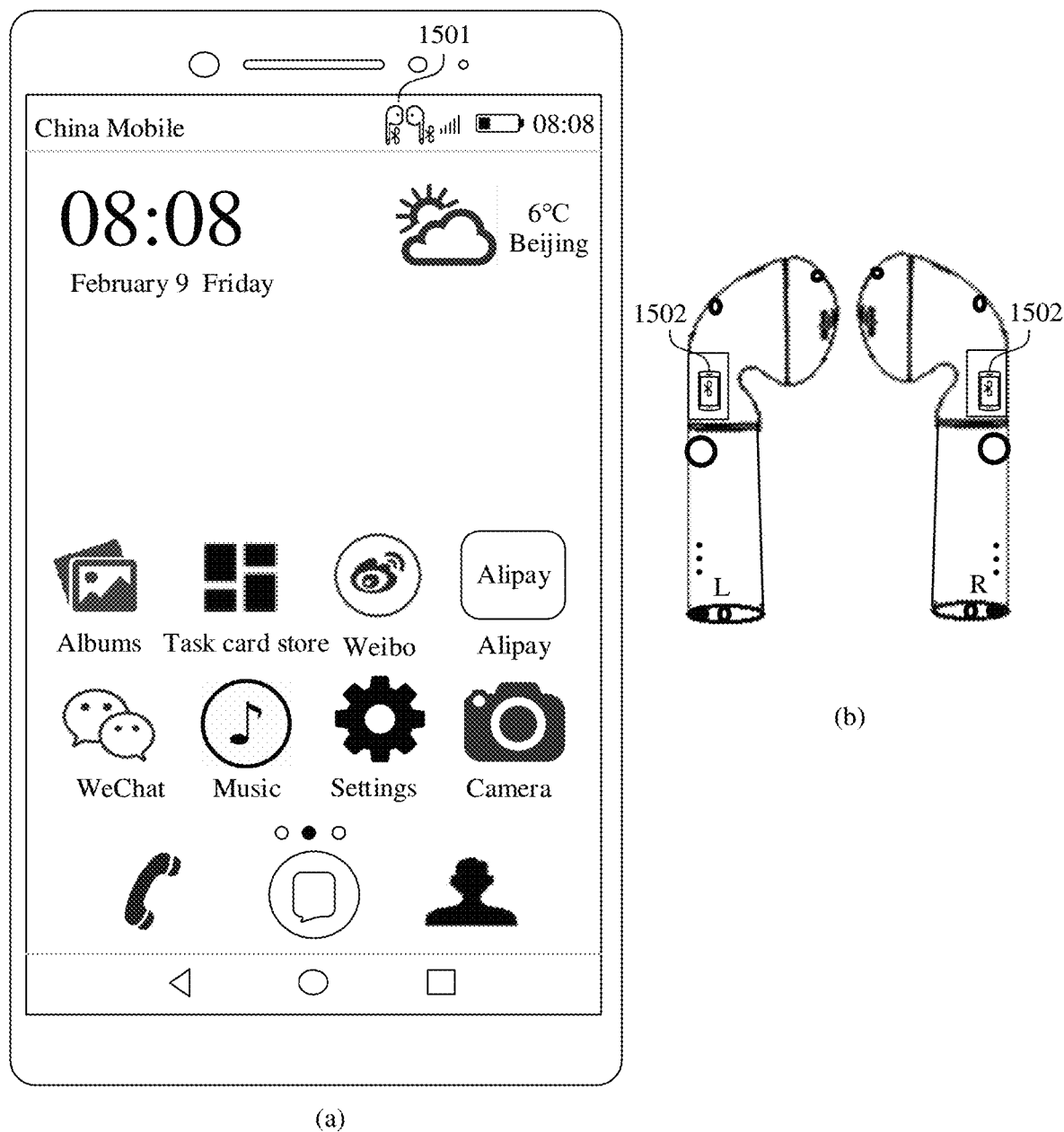
FIG. 15 is a schematic diagram of a scenario according to an embodiment of this application.

After the mobile phone and the second earbud establish the pairing connection in step 505, the dual-feed connection is implemented between the mobile phone and the TWS headset. In this case, the mobile phone and/or the TWS headset may notify, in a form such as a sound, display, vibration, or indicator light form, the user that the mobile phone and the TWS headset have established the pairing connection. For example, referring to (a) in FIG. 15, the mobile phone may display an icon 1501 of the TWS headset in a status bar, indicating that the mobile phone and the TWS headset have established the Bluetooth pairing connection. For another example, referring to (b) in FIG. 15, icons 1502 of the mobile phone are displayed on a display screen of the TWS headset, indicating that the TWS headset and the mobile phone have established the pairing connection.

For another example, in another implementation solution, step 505 may include: The first earbud may send connection information 2 to the mobile phone, where the connection information 2 may include the MAC address of the second earbud, which may indicate that the second earbud and the first earbud are used in pairs, to notify the mobile phone that the mobile phone can be connected to the second earbud. The mobile phone may establish the Bluetooth connection to the second earbud based on the connection information 2, and the mobile phone maintains the Bluetooth connection to the first earbud.

In this solution, because the first earbud stores the MAC address of the second earbud after the first earbud and the second earbud establish the Bluetooth pairing connection, the first earbud may forward the MAC address of the second earbud to the mobile phone by using the connection information 2, so that the mobile phone establishes the Bluetooth pairing connection to the second earbud based on the MAC address of the second earbud. After receiving the MAC address of the second earbud in the connection information 2 sent by the first earbud, the mobile phone may determine that the first earbud and the second earbud are used as a pair of devices.

Figure 16:
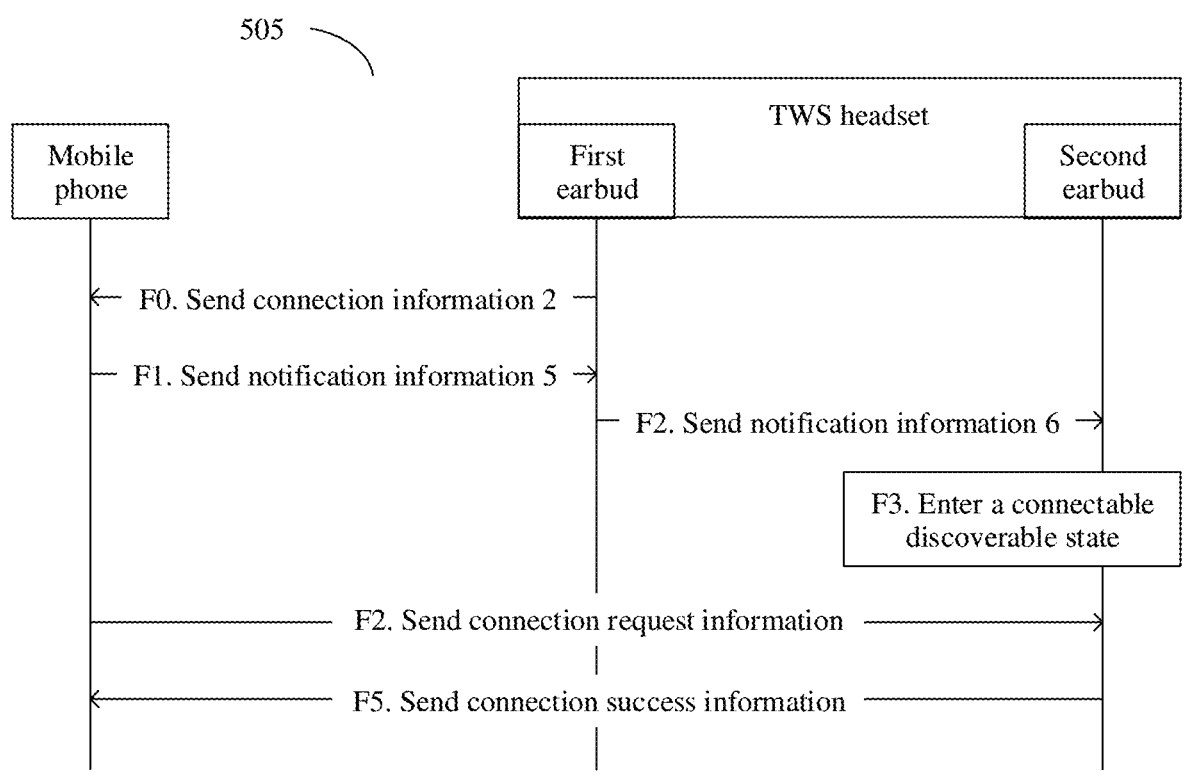
FIG. 16 is a flowchart of another Bluetooth connection method according to an embodiment of this application.

In an embodiment, in step 505, the mobile phone may proactively be connected to the second earbud. Referring to FIG. 16, step 505 may specifically include the following steps.

F0. The first earbud sends the connection information 2 to the mobile phone, to indicate that the second earbud and the first earbud are used in pairs.

After receiving the connection information 2, the mobile phone learns that the mobile phone can be connected to the second earbud.

F1. After receiving the connection information 2, the mobile phone sends notification information 5 to the first earbud.

F2. After receiving the notification information 5, the first earbud sends notification information 6 to the second earbud, to notify the second earbud that the second earbud can be connected to the mobile phone.

The notification information 6 may include the MAC address of the mobile phone, and the second earbud may learn, based on the notification information 6, that the second earbud can be connected to the mobile phone.

It can be understood that the first earbud can send the notification information 6 to the second earbud before receiving the notification information 5. In other words, step F1 may be omitted.

F3. After receiving the notification information 6, the second earbud enters the connectable discoverable state, so that the second earbud can be connected to another device.

In other words, in steps F1-F3, the mobile phone may indicate, by using the first earbud, the second earbud to enter the connectable discoverable state, so that the second earbud can be connected to the mobile phone.

F4. After receiving the connection information 2, the mobile phone sends connection request information to the second earbud.

F5. After receiving the notification information 6 and the connection request information, the second earbud sends connection success information to the mobile phone.

If the second earbud determines that the MAC address of the mobile phone in the connection request information is consistent with the MAC address of the mobile phone in the notification information 6, it may indicate that the device that requests to establish the connection to the second earbud is the device indicated by the first earbud, and therefore the second earbud can send the connection success information to the mobile phone.

For a specific implementation process of steps F0-F5, reference may be made to related descriptions of steps D0-D5. Details are not described herein again.

In another embodiment, in an alternative to steps F1-F4, the mobile phone may send the connection request information to the second earbud through forwarding performed by the first earbud.

Figure 17:
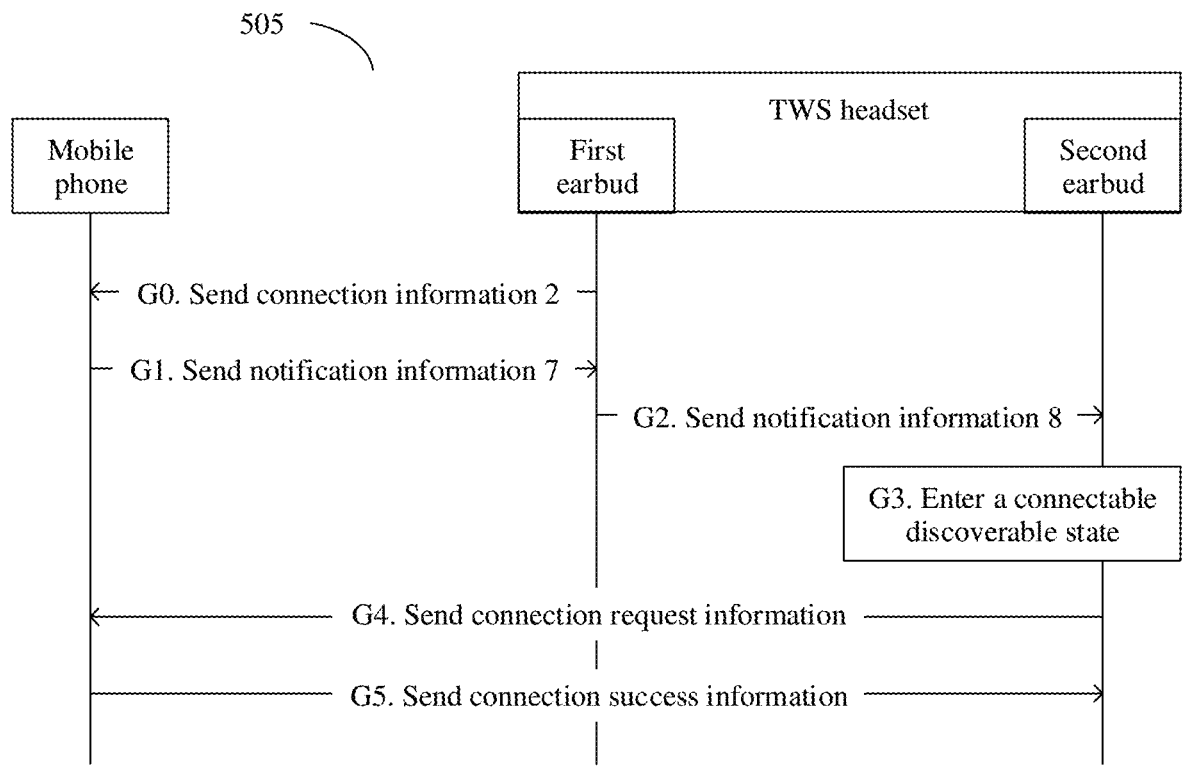
FIG. 17 is a flowchart of another Bluetooth connection method according to an embodiment of this application.

In another embodiment, in step 505, the second earbud may proactively be connected to the mobile phone. Referring to FIG. 17, step 505 may include the following steps.

G0. The first earbud sends the connection information 2 to the mobile phone, to indicate that the second earbud and the first earbud are used in pairs.

After receiving the connection information 2, the mobile phone learns that the mobile phone can be connected to the second earbud.

G1. After receiving the connection information 2, the mobile phone sends notification information 7 to the first earbud.

G2. After receiving the notification information 7, the first earbud sends notification information 8 to the second earbud, to notify the second earbud that the second earbud can be connected to the mobile phone.

The notification information 8 may include the MAC address of the mobile phone.

G3. After receiving the notification information 8, the second earbud enters the connectable discoverable state, so that the second earbud can be connected to another device.

In other words, in steps G1-G3, the mobile phone may indicate, by using the first earbud, the second earbud to enter the connectable discoverable state, so that the second earbud can be connected to the mobile phone.

G4. The second earbud sends connection request information to the mobile phone based on the notification information 8.

The mobile phone may send the connection request information to the mobile phone based on the MAC address of the mobile phone in the notification information 8.

G5. After receiving the connection request information, the mobile phone sends connection success information to the second earbud.

If the mobile phone determines that the MAC address of the second earbud in the connection information 2 is consistent with the MAC address of the second earbud in the connection request information sent by the first earbud, it may indicate that the device that requests to establish the connection to the mobile phone is the device indicated by the first earbud, and therefore the mobile phone can send the connection success information to the second earbud.

For a specific implementation process of steps G0-G5, reference may be made to related descriptions of steps E0-E5. Details are not described herein again.

In addition, after step 505, the mobile phone and/or the second earbud may further notify the first earbud that the mobile phone and the second earbud have established the Bluetooth connection.

It can be understood that the mobile phone and the second earbud may establish, by using a medium effect of the first earbud, the Bluetooth connection in another manner. The foregoing manner is merely used as an example for description, but does not constitute any specific limitation.

After the mobile phone and the second earbud establish the pairing connection, the mobile phone may maintain the Bluetooth connections both to the first earbud and the second earbud, thereby maintaining the dual-feed connection between the mobile phone and the TWS headset.

After the dual-feed connection is implemented between the mobile phone and the first earbud and between the mobile phone and the second earbud, the mobile phone may associatively store the MAC address of the first earbud with the MAC address of the second earbud, to indicate that the first earbud and the second earbud are used as a pair of devices.

After the dual-feed connection is established, the wireless connection between the first earbud and the second earbud may be maintained, or the wireless connection may be removed. To be specific, optionally, referring to FIG. 5, after step 505, the method may further include the following step.

506. Remove the wireless connection between the first earbud and the second earbud.

After the dual-feed connection is established, the mobile phone may send audio data both to the first earbud and the second earbud, and the first earbud and the second earbud synchronously play audio signals of corresponding channels. For example, the user may use the first earbud and the second earbud to play music.

It can be understood that if the user first starts music playing, and then taps the first identifier of the first earbud to establish the dual connection between the mobile phone and the TWS, the TWS headset is used to play music after the dual connection to the TWS headset is established. If the user first taps the first identifier of the first earbud to establish the dual connection between the mobile phone and the TWS, and then starts music playing, the TWS headset can be used to play music after the user starts music playing.

In an embodiment, the mobile phone may send stereo audio data (including left channel data and right channel data) both to the first earbud and the second earbud, and the first earbud and the second earbud separately extract, from the stereo audio data, audio data of a corresponding channel for playing.

In another embodiment, the first earbud and the second earbud may separately receive, from the mobile phone, audio data of a corresponding channel for playing. In this solution, because there is a small volume of audio data received by the first earbud and the second earbud from the mobile phone and a low audio bit rate, a probability that a wireless environment is interfered with and a transmission delay can be reduced. In addition, a working time of a radio frequency receiver of each earbud can be reduced, and power consumption of the earbud can be reduced.

Moreover, during music playing, the user may indicate pause, playing, switching to a previous song, switching to a next song, and the like by performing a touch operation on an earbud or a trigger operation on the mobile phone or in a voice form, and the mobile phone and the TWS headset can make a response and perform processing in time by using the dual-feed connection. Furthermore, voice data collected by a MIC on the TWS headset may further be sent to the mobile phone by using a connection channel between each earbud and the mobile phone.

The foregoing embodiment is described by using an example in which the first earbud sends a BLE primary broadcast message in a discovery process. The first earbud may alternatively send a secondary broadcast message, so that the first earbud is discovered by the mobile phone. For example, as an alternative to ADV_IND in step B2, that is, the primary broadcast message, the first earbud may send a series of secondary broadcast messages such as an ADV_EXT_IND message (a primary broadcast message), an AUX_ADV_IND message, an AUX_SCAN_RSP message, and an AUX_SYNC_IND message. Compared with sending the secondary broadcast message, the first earbud sends the primary broadcast message, so that the first earbud can be discovered by the mobile phone more quickly, thereby improving efficiency of performing the connection with the mobile phone.

In addition, the mobile phone and the first earbud may alternatively perform discovery in another manner. For example, after enabling the Bluetooth function of the mobile phone, the user may further enable a Bluetooth search function. In this case, the mobile phone enters a Bluetooth scanning state, and scans another device in a frequency hopping manner. The first earbud may send a pairing broadcast message in a frequency hopping manner. When the mobile phone and the first earbud are frequency-hopped to a same frequency band, the mobile phone detects the pairing broadcast message from the first earbud to discover the first earbud, and then establishes the Bluetooth connection to the first earbud. Then, the mobile phone and the first earbud may perform other steps in the foregoing embodiment.

The foregoing mainly describes the process in which the dual-feed connection is established between the mobile phone and the TWS headset for the first time. When a dual-feed connection is re-established between the mobile phone and the TWS headset subsequently, in an implementation solution, the connection method provided in the foregoing embodiment of this application may be performed between the TWS headset and the mobile phone again. In another implementation solution, the TWS headset can automatically be connected to the mobile phone, without performing the step of indicating, by each of the two parties, that the party supports the dual-feed mode, and the like, so that pairing efficiency can be improved. The following provides examples for description.

For example, in an embodiment, the mobile phone has stored a history of pairing between the first earbud and the second earbud. After receiving the broadcast message from the first earbud, the mobile phone determines that the mobile phone has been paired with the first earbud and the second earbud, so as to automatically establish the dual-feed connection to the first earbud and the second earbud. For example, the mobile phone has stored the associated MAC addresses of the first earbud and the second earbud, and in this case, the mobile phone may directly perform paging on the first earbud and the second earbud based on the MAC addresses, to establish the dual-feed connection to the first earbud and the second earbud. For another example, the mobile phone automatically performs paging on the first earbud based on the MAC address of the first earbud, to establish the Bluetooth connection to the first earbud; and the mobile phone and the second earbud establish the Bluetooth connection based on the MAC address of the mobile phone or the second earbud forwarded by the first earbud, thereby implementing the dual-feed connection. For still another example, after receiving the pairing broadcast message from the first earbud, the mobile phone determines, based on the stored MAC address, that the mobile phone has been paired with the first earbud, to establish the Bluetooth connection to the first earbud; and likewise, the mobile phone and the second earbud may establish the Bluetooth connection, thereby implementing the dual-feed connection.

In another embodiment, the first earbud and the second earbud have stored the MAC address of the mobile phone, indicating that the TWS headset has been paired with the mobile phone. Therefore, the first earbud and the second earbud may directly perform paging on the mobile phone based on the MAC address of the mobile phone, to establish the dual-feed connection between the first earbud and the mobile phone and between the second earbud and the mobile phone.

In another embodiment, the first earbud has stored the MAC address of the mobile phone, and forwards the MAC address of the mobile phone to the second earbud. After detecting a pairing broadcast from the mobile phone, the first earbud and the second earbud establish the Bluetooth connections to the mobile phone.

After the dual-feed connection is established between the mobile phone and the TWS headset, if a dual-feed connection needs to be established between the mobile phone and another TWS headset or a dual-feed connection needs to be established between another mobile phone and the TWS headset subsequently, the foregoing procedure for establishing the dual-feed connection for the first time may be performed again.

In another embodiment, when the user uses the first earbud to listen to music, the first earbud and the mobile phone have established the Bluetooth connection, and the first earbud is in monaural mode. When the user wants to use the TWS headset, the TWS headset may be switched to a binaural mode. In one solution, the first earbud and the second earbud have established the wireless connection, and the second earbud and the mobile phone establish the Bluetooth connection by using the first earbud, so that music is played by using a dual-feed connection channel. In another solution, the mobile phone and the TWS headset perform the procedure for establishing the dual-feed connection for the first time in the foregoing embodiment, to re-establish a Bluetooth connection between the first earbud and the mobile phone and establish a Bluetooth connection between the second earbud and the mobile phone, so that music is played by using a dual-feed connection channel. After the dual-feed connection is established between the mobile phone and the TWS headset, the user can play stereo music by using the two TWS earbuds. If the user uses only one TWS earbud subsequently, the Bluetooth connection between the other earbud that is not used and the mobile phone may be maintained, or the Bluetooth connection between the other earbud and the mobile phone may be removed so that the TWS headset is switched to a monaural mode. For example, when the other earbud is taken out from an ear, the Bluetooth connection between the other earbud and the mobile phone may be removed.

It can be understood that, to implement the foregoing functions, the electronic device, the first wireless earbud, and the second wireless earbud include corresponding hardware and/or software modules for performing the functions. With reference to the algorithm steps described in the embodiments disclosed in this specification, this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In this embodiment, function modules of the electronic device, the first wireless earbud, and the second wireless earbud may be obtained through division based on the foregoing method examples. For example, each function module may be obtained through division in correspondence to each function, or at least two functions may be integrated into one processing module. The integrated module may be implemented by using hardware. It should be noted that, in this embodiment, module division is used as an example, and is merely a logical function division. In actual implementation, another division manner may be used.

Figure 18:
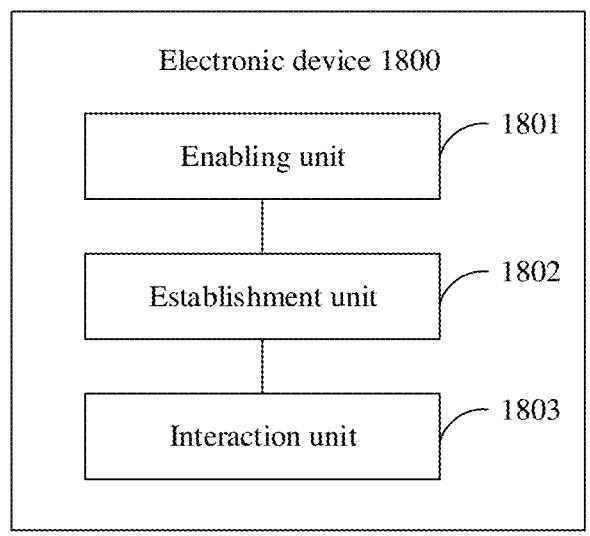
FIG. 18 is a schematic structural diagram of an electronic device according to an embodiment of this application.

When each function module is obtained through division in correspondence to each function, FIG. 18 is a possible schematic composition diagram of an electronic device 1800 in the foregoing embodiments. As shown in FIG. 18, the electronic device 1800 may include an enabling unit 1801, an establishment unit 1802, and an interaction unit 1803.

The enabling unit 1801 may be configured to: support the electronic device 1800 in performing step 500 and the like, and/or perform other processes in the technologies described in this specification.

The establishment unit 1802 may be configured to: support the electronic device 1800 in performing steps 503-505 and the like, and/or perform other processes in the technologies described in this specification.

The interaction unit 1803 may be configured to: support the electronic device 1800 in performing steps A4, B2, and C0, and the like to display the identifier, and receive a user operation, and/or perform other processes in the technologies described in this specification.

It should be noted that all related content of various steps in the foregoing method embodiment may be cited in function descriptions of a corresponding function module. Details are not described herein again. The electronic device 1800 provided in this embodiment is configured to perform the foregoing Bluetooth connection method, and therefore can achieve a same effect as the foregoing implementation method.

When the integrated unit is used, the electronic device 1800 may include a processing module, a storage module, and a communications module. The processing module may be configured to control and manage actions of the electronic device 1800. For example, the processing module may be configured to support the electronic device 1800 in performing steps performed by the enabling unit 1801, the establishment unit 1802, and the interaction unit 1803. The storage module may be configured to support the electronic device 1800 in storing the MAC address of the first wireless earbud, the MAC address of the second wireless earbud, and the like, and storing program code, data, and the like. The communications module may be configured to support the electronic device 1800 in communicating with another device.

The processing module may be a processor or a controller. The processor may implement or execute various example logical blocks, modules, and circuits described with reference to content disclosed in this application. The processor may be a combination of processors implementing a computing function, for example, a combination including one or more microprocessors, or a combination of a digital signal processor (digital signal processor, DSP) and a microprocessor. The storage module may be a memory. The communications module may specifically be a device that interacts with another electronic device, such as a radio frequency circuit, a Bluetooth chip, or a Wi-Fi chip.

In an embodiment, when the processing module is a processor and the storage module is a memory, the electronic device in this embodiment may be an electronic device that is of the structure shown in FIG. 2.

Figure 19:
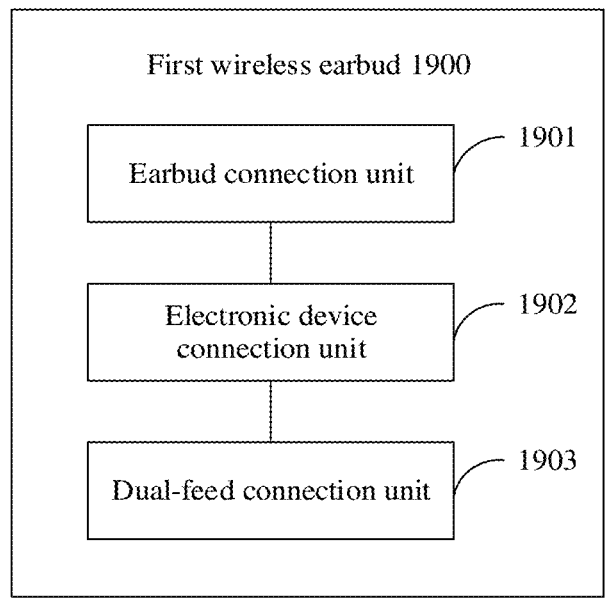
FIG. 19 is a schematic structural diagram of a first wireless earbud according to an embodiment of this application.

When each function module is obtained through division in correspondence to each function, FIG. 19 is a possible schematic composition diagram of a first wireless earbud 1900 in the foregoing embodiments. As shown in FIG. 19, the first wireless earbud 1900 may include an earbud connection unit 1901, an electronic device connection unit 1902, and a dual-feed connection unit 1903.

The earbud connection unit 1901 may be configured to: support the first wireless earbud 1900 in performing steps 501 and 506, and the like, and/or perform other processes in the technologies described in this specification.

The electronic device connection unit 1902 may be configured to: support the first wireless earbud 1900 in performing step 503 and the like, and/or perform other processes in the technologies described in this specification.

The dual-feed connection unit 1903 may be configured to: support the first wireless earbud 1900 in performing step 505 and the like, and/or perform other processes in the technologies described in this specification.

It should be noted that all related content of various steps in the foregoing method embodiment may be cited in function descriptions of a corresponding function module. Details are not described herein again.

The first wireless earbud 1900 provided in this embodiment is configured to perform the foregoing Bluetooth connection method, and therefore can achieve a same effect as the foregoing implementation method.

Figure 20:
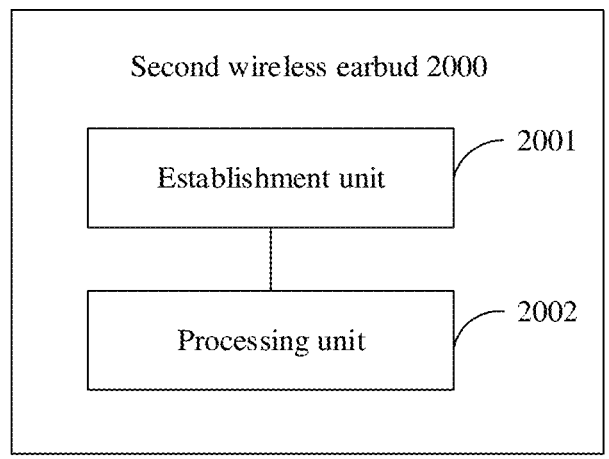
FIG. 20 is a schematic structural diagram of a second wireless earbud according to an embodiment of this application.

When each function module is obtained through division in correspondence to each function, FIG. 20 is a possible schematic composition diagram of a second wireless earbud 2000 in the foregoing embodiments. As shown in FIG. 20, the second wireless earbud 2000 may include an establishment unit 2001 and a processing unit 2002.

The establishment unit 2001 may be configured to: support the second wireless earbud 2000 in performing steps 501 and 506, and the like, and/or perform other processes in the technologies described in this specification.

The processing unit 2002 may be configured to: support the second wireless earbud 2000 in performing step 505 and the like, and/or perform other processes in the technologies described in this specification.

It should be noted that all related content of various steps in the foregoing method embodiment may be cited in function descriptions of a corresponding function module. Details are not described herein again.

The second wireless earbud 2000 provided in this embodiment is configured to perform the foregoing Bluetooth connection method, and therefore can achieve a same effect as the foregoing implementation method.

An embodiment of this application further provides a wireless device. The wireless device may include the first wireless earbud shown in FIG. 19 and the second wireless earbud shown in FIG. 20 The first wireless earbud and the second wireless earbud can implement the Bluetooth connection methods provided in the foregoing method embodiments. For example, the wireless device may be a TWS headset.

An embodiment of this application further provides a computer storage medium. The computer storage medium stores computer instructions. When the computer instructions are run on an electronic device, a first wireless earbud, or a second wireless earbud, the electronic device, the first wireless earbud, or the second wireless earbud is enabled to perform the foregoing related method steps to implement the Bluetooth connection methods in the foregoing embodiments.

An embodiment of this application further provides a computer program product. When the computer program product is run on a computer, the computer is enabled to perform the foregoing related steps to implement the Bluetooth connection methods performed by the electronic device in the foregoing embodiments.

In addition, an embodiment of this application further provides an apparatus. The apparatus may specifically be a chip, a component, or a module, and the apparatus may include a processor and a memory connected to each other. The memory is configured to store computer executable instructions. When the apparatus runs, the processor can execute the computer executable instructions stored in the memory, so that the chip performs the Bluetooth connection methods performed by the electronic device, the first wireless earbud, or the second wireless earbud in the foregoing method embodiments.

Any one of the electronic device, the computer storage medium, the computer program product, or the chip provided in the embodiments is configured to perform the corresponding method provided above. Therefore, for beneficial effects thereof, reference may be made to the beneficial effects of the corresponding method provided above. Details are not described herein again.

Another embodiment of this application provides a system. The system may include the foregoing electronic device, first wireless earbud, and second wireless earbud, and can be configured to implement the foregoing Bluetooth connection methods.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving, by an electronic device, from a first wireless earbud, a first identification information using a Bluetooth low energy (BLE) non-connectable broadcast message or a BLE connectable broadcast message;
establishing, by the electronic device, a first Bluetooth connection to the first wireless earbud, wherein the first wireless earbud is wirelessly connected to a second wireless earbud by a wireless connection, and the first wireless earbud and the second wireless earbud are a pair of wireless earbuds;
sending, by the electronic device, second identification information to the first wireless earbud, wherein the second identification information indicates that the electronic device supports simultaneously maintaining Bluetooth connections to the first wireless earbud and the second wireless earbud;
establishing, by the electronic device, after sending second identification information to the first wireless earbud, a second Bluetooth connection to the second wireless earbud using the first wireless earbud; and
simultaneously maintaining, by the electronic device, the first Bluetooth connection and the second Bluetooth connection.

2. The method according to claim 1, further comprising:
sending, by the electronic device, first audio data to the first wireless earbud through the first Bluetooth connection; and
sending, by the electronic device, second audio data to the second wireless earbud through the second Bluetooth connection.

3. The method according to claim 1, wherein before establishing, by the electronic device, the second Bluetooth connection to the second wireless earbud, the method further comprises:
receiving, by the electronic device from the first wireless earbud, information indicating that the second wireless earbud and the first wireless earbud are configured to be used as a pair.

4. The method according to claim 3,
wherein the first identification information indicates that the first wireless earbud and the second wireless earbud support simultaneously maintaining Bluetooth connections to the electronic device.

5. The method according to claim 4, wherein sending, by the electronic device, the second identification information to the first wireless earbud comprises:
displaying, by the electronic device, an identifier of the first wireless earbud; and
sending, by the electronic device, the second identification information to the first wireless earbud after detecting an operation performed by a user on the identifier of the first wireless earbud.

6. The method according to claim 4, wherein the electronic device sends the second identification information using a Bluetooth low energy (BLE) message.

7. An electronic device, comprising:
a touchscreen;
a non-transitory computer-readable memory storing one or more programs;
one or more processors; and
a plurality of application programs; and
wherein the one or more programs comprise program instructions, and the one or more processors are configured to perform the following operations according to the program instructions stored in the non-transitory computer-readable memory:
receiving, from a first wireless earbud, a first identification information using a Bluetooth low energy (BLE) non-connectable broadcast message or a BLE connectable broadcast message;
establishing a first Bluetooth connection to the first wireless earbud, wherein the first wireless earbud is wirelessly connected to a second wireless earbud by a wireless connection, and the first wireless earbud and the second wireless earbud are a pair of wireless earbuds;

sending second identification information to the first wireless earbud, wherein the second identification information indicates that the electronic device supports simultaneously maintaining Bluetooth connections to the first wireless earbud and the second wireless earbud;

establishing, after sending second identification information to the first wireless earbud, a second Bluetooth connection to the second wireless earbud using the first wireless earbud; and simultaneously maintaining the first Bluetooth connection and the second Bluetooth connection.

8. The electronic device according to claim 7, wherein the one or more processors are further configured to perform the following operations according to the program instructions stored in the memory:

sending first audio data to the first wireless earbud through the first Bluetooth connection; and sending second audio data to the second wireless earbud through the second Bluetooth connection.

9. The electronic device according to claim 7, wherein the one or more processors are further configured to perform the following operations according to the program instructions stored in the memory:

receiving, from the first wireless earbud, information indicating that the second wireless earbud and the first wireless earbud are configured to be used as a pair.

10. The electronic device according to claim 7, wherein the first identification information further indicates that the first wireless earbud and the second wireless earbud support simultaneously maintaining Bluetooth connections to the electronic device.

11. The electronic device according to claim 10, wherein sending the second identification information to the first wireless earbud comprises:

displaying an identifier of the first wireless earbud; and sending the second identification information to the first wireless earbud after detecting an operation performed by a user on the identifier of the first wireless earbud.

12. The electronic device according to claim 10, wherein the electronic device sends the second identification information using a Bluetooth low energy (BLE) message.

* * * * *